United States Patent
Dahan

(10) Patent No.: US 9,946,639 B2
(45) Date of Patent: Apr. 17, 2018

(54) TRANSACTIONAL BOUNDARIES FOR VIRTUALIZATION WITHIN A SOFTWARE SYSTEM

(71) Applicant: CA, Inc., Islandia, NY (US)

(72) Inventor: Jean David Dahan, Cedar Park, TX (US)

(73) Assignee: CA, Inc., Islandia, NY (US)

( * ) Notice: Subject to any disclaimer, the term of this patent is extended or adjusted under 35 U.S.C. 154(b) by 13 days.

(21) Appl. No.: 15/085,971

(22) Filed: Mar. 30, 2016

(65) Prior Publication Data

US 2017/0286281 A1 Oct. 5, 2017

(51) Int. Cl.
G06F 11/36 (2006.01)

(52) U.S. Cl.
CPC ...... G06F 11/3696 (2013.01); G06F 11/3608 (2013.01)

(58) Field of Classification Search
CPC .......................... G06F 11/3696; G06F 11/3608
See application file for complete search history.

(56) References Cited

U.S. PATENT DOCUMENTS

| | | | |
|---|---|---|---|
| 5,345,587 A | 9/1994 | Fehskens et al. | |
| 5,450,586 A | 9/1995 | Kuzara et al. | |
| 5,576,965 A | 11/1996 | Akasaka et al. | |
| 6,122,627 A | 9/2000 | Carey et al. | |
| 6,134,540 A | 10/2000 | Carey et al. | |
| 6,810,368 B1 | 10/2004 | Pednault | |
| 6,879,946 B2 | 4/2005 | Rong et al. | |
| 6,883,162 B2 | 4/2005 | Jackson et al. | |
| 6,957,199 B1 | 10/2005 | Fisher | |
| 7,376,549 B2 | 5/2008 | Horikawa | |
| 7,437,710 B2 | 10/2008 | Bau et al. | |
| 7,487,508 B2 | 2/2009 | Fu et al. | |
| 7,539,980 B1 | 5/2009 | Bailey et al. | |
| 7,552,036 B2 | 6/2009 | Oslake et al. | |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Viva Miller
(74) *Attorney, Agent, or Firm* — Alliance IP, LLC

(57) ABSTRACT

Transaction data is received identifying characteristics of a particular transaction involving the first software component and a second software component as observed by an agent during operation of the system. The particular transaction is contemporaneous with another transaction involving software components in the system. It is determined, from the transaction data, that the particular transaction falls within a defined transaction boundary for the system and the other transaction falls outside the transaction boundary. A virtual service is instantiated for use in the particular transaction that simulates responses of a particular software component of the system. Another software component of the system interacts with the virtual service in the particular transaction based on the particular transaction falling within the transaction boundary, and the other software component interacts with the particular software component in the other transaction based on the other transaction falling outside the transaction boundary.

20 Claims, 14 Drawing Sheets

(56) References Cited

U.S. PATENT DOCUMENTS

| | | | |
|---|---|---|---|
| 7,676,538 B2 | 3/2010 | Potter et al. | |
| 7,783,613 B2 | 8/2010 | Gupta et al. | |
| 7,805,496 B2 | 9/2010 | Aiber et al. | |
| 7,873,594 B2 | 1/2011 | Harada et al. | |
| 7,966,183 B1 | 6/2011 | Kryskow et al. | |
| 8,060,864 B1 | 11/2011 | Michelsen | |
| 8,112,262 B1 | 2/2012 | Michelsen | |
| 8,538,740 B2 | 9/2013 | Kumar et al. | |
| 8,898,681 B1 | 11/2014 | Acheff et al. | |
| 8,935,573 B2 | 1/2015 | Horsman et al. | |
| 9,201,767 B1 | 12/2015 | Tarlton et al. | |
| 9,323,645 B2 | 4/2016 | Michelsen | |
| 9,531,609 B2 | 12/2016 | Talot et al. | |
| 2002/0010781 A1 | 1/2002 | Tuatini | |
| 2003/0055670 A1 | 3/2003 | Kryskow et al. | |
| 2003/0217162 A1 | 11/2003 | Fu et al. | |
| 2004/0078782 A1 | 4/2004 | Clement et al. | |
| 2004/0128259 A1 | 7/2004 | Blakeley et al. | |
| 2004/0162778 A1 | 8/2004 | Kramer et al. | |
| 2004/0230674 A1 | 11/2004 | Pourheidari et al. | |
| 2004/0243334 A1 | 12/2004 | Wrigley et al. | |
| 2004/0243338 A1 | 12/2004 | Sabiers et al. | |
| 2005/0027648 A1 | 2/2005 | Knowles et al. | |
| 2005/0063335 A1 | 3/2005 | Shenfield et al. | |
| 2005/0198401 A1 | 9/2005 | Chron et al. | |
| 2005/0289231 A1 | 12/2005 | Harada et al. | |
| 2006/0224375 A1 | 10/2006 | Barnett et al. | |
| 2006/0235675 A1 | 10/2006 | Oslake et al. | |
| 2007/0006177 A1 | 1/2007 | Aiber et al. | |
| 2007/0033442 A1 | 2/2007 | Tillmann et al. | |
| 2007/0073682 A1 | 3/2007 | Adar et al. | |
| 2007/0169003 A1 | 7/2007 | Branda et al. | |
| 2007/0261035 A1 | 11/2007 | Duneau | |
| 2007/0277158 A1 | 11/2007 | Li et al. | |
| 2008/0010074 A1 | 1/2008 | Brunswig et al. | |
| 2008/0120129 A1 | 5/2008 | Seubert et al. | |
| 2008/0127093 A1 | 5/2008 | Fernandez-Ivern et al. | |
| 2008/0262797 A1* | 10/2008 | Carusi | H04L 43/00 702/186 |
| 2009/0064149 A1 | 3/2009 | Singh et al. | |
| 2009/0094684 A1 | 4/2009 | Chinnusamy et al. | |
| 2009/0119301 A1 | 5/2009 | Cherkasova et al. | |
| 2009/0187534 A1 | 7/2009 | Broll et al. | |
| 2009/0204669 A1 | 8/2009 | Allan | |
| 2009/0234710 A1 | 9/2009 | Hassine et al. | |
| 2009/0282403 A1 | 11/2009 | Poole et al. | |
| 2009/0298458 A1 | 12/2009 | Bakker et al. | |
| 2010/0037100 A1 | 2/2010 | Lopian | |
| 2010/0145962 A1 | 6/2010 | Chen et al. | |
| 2010/0318974 A1 | 12/2010 | Hrastnik et al. | |
| 2012/0059868 A1 | 3/2012 | Buckl et al. | |
| 2012/0084754 A1 | 4/2012 | Ziegler et al. | |
| 2014/0108589 A1 | 4/2014 | Dhanda | |
| 2014/0223418 A1* | 8/2014 | Michelsen | G06F 11/3696 717/135 |
| 2015/0205699 A1 | 7/2015 | Michelsen | |
| 2015/0205700 A1 | 7/2015 | Michelsen | |
| 2015/0205701 A1 | 7/2015 | Michelsen | |
| 2015/0205702 A1 | 7/2015 | Michelsen | |
| 2015/0205703 A1 | 7/2015 | Michelsen | |
| 2015/0205708 A1 | 7/2015 | Michelsen | |
| 2015/0205712 A1 | 7/2015 | Michelsen | |
| 2015/0205713 A1 | 7/2015 | Michelsen | |
| 2016/0125052 A1 | 5/2016 | Dahan et al. | |
| 2016/0239409 A1 | 8/2016 | de Oliveira Staudt et al. | |
| 2017/0075798 A1* | 3/2017 | Lau | G06F 11/3688 |

OTHER PUBLICATIONS

LISA, 2.0 User's Guide, Interactive TKO, Feb. 27, 2003, pp. 1-130.
LISA, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.com/questions/19899236/is-tcp-protocol-statelessor-not" pp. 1-3 (2013).

* cited by examiner

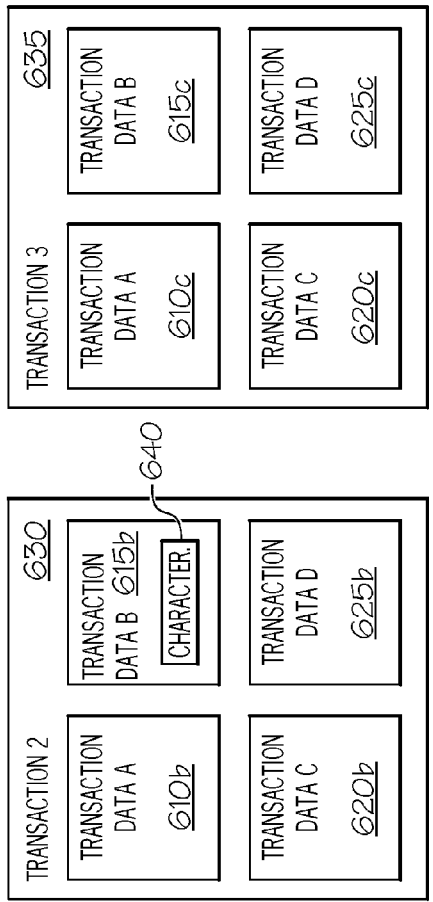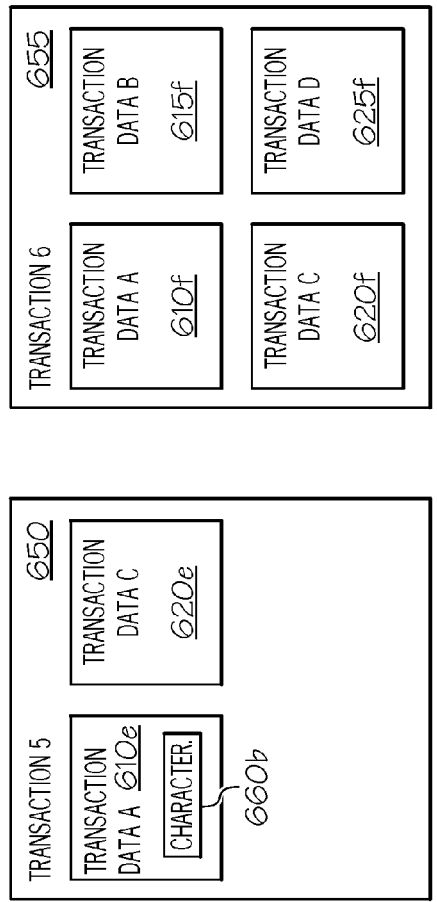
FIG. 6A
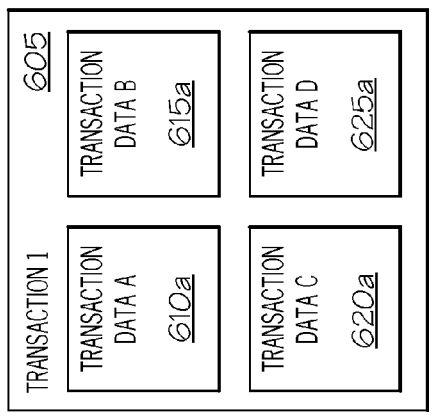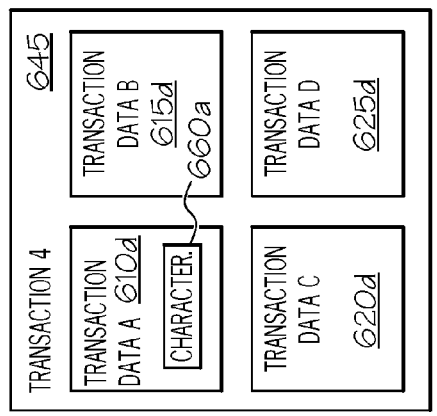
FIG. 6B

TRANSACTIONAL BOUNDARIES FOR VIRTUALIZATION WITHIN A SOFTWARE SYSTEM

BACKGROUND

The present disclosure relates in general to the field of computer software development tools, and more specifically, to facilitating a shared software development environment.

Software development can involve a variety of tools to support a development life cycle of an application or system. The development cycle can include activities such as system design, development, integration and testing, deployment, maintenance, and evaluation. As software systems become more complex, such as in service-oriented architectures linking multiple traditional systems (from potentially multiple different software vendors) other development cycles and strategies are emerging, including waterfall, spiral, Agile development, rapid prototyping, incremental, and synchronize and stabilize. In the case of Agile methodologies, the focus can be on lightweight processes which allow for rapid and iterative changes within the development cycle. Further complicating the tasks and management of development activities within modern software development is the reality that multiple developers often collaborate to build and perform development tasks involving a single system. Traditional development tools, such as debuggers, profilers, loggers, etc. can be ill-equipped to handle the evolving landscape of software development, particularly within shared development environments.

BRIEF SUMMARY

According to one aspect of the present disclosure, transaction data can be received from an agent instrumented on a first software component in a system, the transaction data identifying characteristics of a particular transaction involving the first software component and a second software component as observed by the agent during operation of the system. The particular transaction may be contemporaneous with another transaction involving software components in the system. It can be determined, from the transaction data, that the particular transaction falls within a defined transaction boundary for the system and the other transaction falls outside the transaction boundary. A virtual service can be instantiated for use in the particular transaction that simulates responses of a particular software component of the system. Another software component of the system can interact with the virtual service in the particular transaction based on the particular transaction falling within the transaction boundary, and the other software component can interact with the particular software component in the other transaction based on the other transaction falling outside the transaction boundary.

BRIEF DESCRIPTION OF THE DRAWINGS

FIGS. 6A-6B are simplified block diagrams illustrating transaction data generated by example agents deployed on software component within a system;

Like reference numbers and designations in the various drawings indicate like elements.

DETAILED DESCRIPTION

Figure 1:
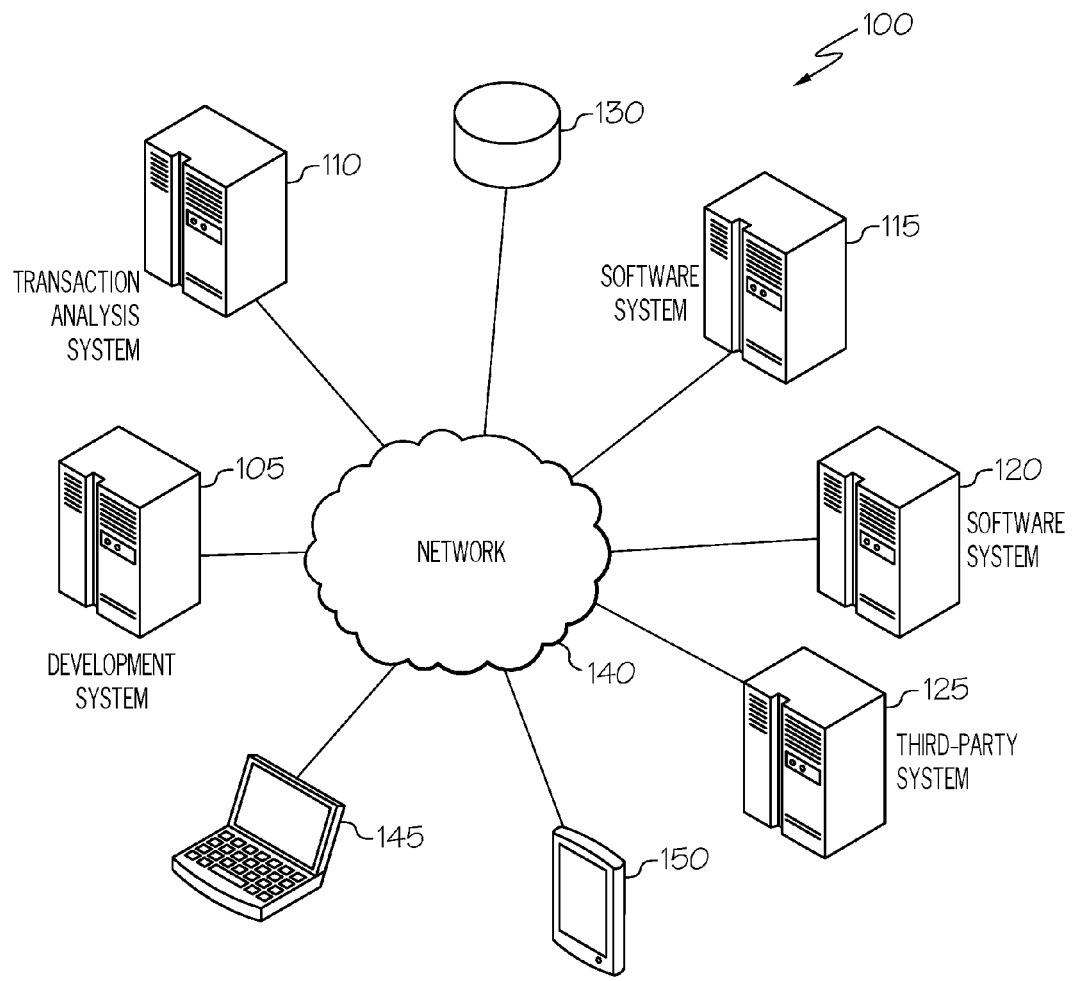
FIG. 1 is a simplified schematic diagram of an example computing system including an example development system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a shared software development system 105 and a transaction analysis system 110, among other hardware and software computing systems. In some implementations, functionality of the development system 105, transaction analysis service system 110, and other systems and tools can be combined or even further divided and implemented among multiple different systems. The shared software development system 105 can be provided with tools for use in the development cycle of a software program, such as a program, or application, hosted on one or more software systems (e.g., 115, 120, 125). Development tools can be provided or supported by the development system 105 such as a profiler tool, a logging tool, a debugger, a source control tool for managing proposed software patches and updates, a software virtualization system, among other examples.

The transaction analysis system 110 can include functionality for enhancing use of the development tools provided by development system 105. For instance, the transaction analysis system 110 can detect conditions or transaction boundaries involving software transactions that may span multiple different systems in a tiered software system. For instance, satisfaction of a condition can be detected upstream from a particular component of the software system, but can be used to selectively trigger performance of a development activity on the particular component, even when the condition would otherwise be impossible to detect from monitoring only the particular component, among other examples. More generally, where certain development activities might traditionally affect multiple portions of a software system (and multiple different developers working on the same software system), the transaction analysis system can enable more precise application of the development tools of development system 105. The transaction analysis system 110 can detect transaction or session boundaries in which a particular development activity is to be performed based on transaction data collected from software-based agents deployed throughout a multi-component software system. This transaction data can be further utilized to observe how software transactions proceed, or flow, through the system.

At least some of software systems (e.g., 115, 120) can host software that is the subject of development activities performed using tools of development system 105. This software can be an application, program, or portion (collectively referred to herein as "component") of a larger, multi-tiered software system. Software components can utilize, consume data and services of, provide data or services to, or otherwise be at least partially dependent on or function in association with one or more other software components hosted on the same (e.g., 115) or a different software server system (e.g., 120, 125). Software components in the system can be hosted on systems (e.g., 115, 120) of a single entity or may be distributed on systems (e.g., 125) controlled by one or more third parties, among other examples. Further, software components in some software systems can interact with and consume data from and/or contribute data to one or more data services or data stores, such as database 130, among other examples. Development activities can potentially be utilized during the development cycles of any one of the various software components in a broader software system and may target only specific functionality or transaction capabilities of the components and the system as a whole.

One or more computing systems and services can be hosted on machines communicatively coupled by one or more networks (e.g., 140), including local networks, public networks, wide area networks, broadband cellular networks, the Internet, and the like. Systems with which a system under development (e.g., 115) can interact can include data stores (e.g., 130), other software systems (e.g., 120, 125), and constituent software components accessible over the one or more networks 140. Further, systems and services (e.g., 105, 110, etc.) provided to support development of the one or more of systems (e.g., hosted on 115, 120, 125, 130, etc.) can also be provided local to or remote from (e.g., over network 140) the target systems (e.g., 115, 120, 125, 130), among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided in the environment. Such user interactions can take place locally at the host systems of such software components or remotely over network 140, using user devices (e.g., 145, 150).

In general, "servers," "clients," "computing devices," "network elements," "hosts," "system-type system entities," "user devices," and "systems" (e.g., 105, 110, 115, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a shared development system 105, transaction analysis system 110, server system (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Modern software development can involve the participation of multiple development team members working substantially concurrently to build, test, deploy, and assess the system. Development activities within a shared software system can be complicated by the multiple developers attempting to access and utilize the same portions of the system to perform development tasks falling under each developer's responsibilities within the team. Further, traditional development tools used to analyze and test systems during development may lack the precision to selectively perform development activities on only a portion of the system (and its transactions) without interfering with the activities of other users (or even customers, in the case of a production system).

As an example, some developer users may be assigned to work on software components of a system that have been or are to be modified before a next release. In other examples, a developer user may be assigned to work to develop or test software components within the context of a future or potential modification to one or more software components. These modified components, however, may not (yet) have relevance to other projects and software components for which other developer users have responsibility. Accordingly, it can be difficult for developer users to be assigned to work on what amount to two alternate versions of the same system. Further, developing two (or more) different parallel systems for purposes of facilitating the specific needs of various developer users can be expensive, time-consuming, and impractical. As an example, a user may be responsible for developing a patch of a particular software component and then testing how the patched software component integrates with the remaining system and its components. In another example, a user may attempt to develop (or modify) a software component to interoperate with an expected change (e.g., patch) to another software component with which it interacts in the system. However, other users may be responsible for development activities that rely on the existing (unmodified) system being available, making it disruptive for a system (or even a test system) to be modified to facilitate the specific needs of a user that would like the proposed or future system changes to be available in connection with that user's specific activities, among other example issues.

In another example, conditional profiling may be provided. Profiling can be utilized to investigate a program's (e.g., a given software component of a larger system) behavior by gathering particular information as the program executes. Profiling typically involves the gathering of specific types of information, such as identifying which functions are called, the frequency and duration of such function calls, and any events occurring during operation of the program. The output of the profiler can include a statistical summary of the observed events or trace of the events. Profiling, in one implementation, can involve a profiler tool sampling a system to periodically (e.g., every few milliseconds) capturing views, or a snapshot, of all of the threads within a particular system or portion of a system (including the corresponding method calls and stacks). A series of such snapshots can be merged into the statistical view generated by the profiler as an output. Profilers do not have access to the actual data being passed between components of a system (e.g., requests, responses, arguments, return values, etc.) and typically are implemented as low overhead tools.

In a system in which multiple transactions may be executing at once, profiling may indiscriminately profile all transactions that occur involving a particular software component (and the execution of its code) during the profiling. This may jeopardize the goals of the profiling, such as when a user launches a test transaction using a particular software component in connection with a profiling session, only to have the profile results document not only the transaction of interest but also all other contemporaneous transactions that utilized the particular software component. In such a case, the developer user may be forced to reserve use of a shared system resource (e.g., one or more particular software components) so as to perform targeted profiling of the system. However, doing so would be disruptive to the remaining team, complicating or foreclosing their own development activities involving that portion of the system, among other example issues.

As another example, debuggers can be utilized in software development to test and debug one or more software components in the system. Breakpoints can be defined throughout the code of software components of the system for use by various developers in a development team to test the portions of the system they are responsible for managing and developing. Some of these breakpoints can likewise be "owned" by individual developer users by virtue of the developer being the author of the breakpoint or the breakpoint having particular debugging value within an area of the system's development that most closely pertains to a given developer-user's responsibilities. In some cases, different breakpoints owned by, or otherwise associated with, different users can be included in the same software component. Further, in some cases, debugging of a software component shared by two or more developers can cause an interruption (e.g., due to the triggering of a corresponding breakpoint) that interferes with the ability of other developer-users to utilize the debugged software component and perform other software development activities contemporaneously. In still additional examples, an instruction set simulator (ISS)-based debuggers can be utilized. For instance, an ISS-based debugger can be loaded with a target software component based on a determination that it falls within a particular transaction boundary, among other example implementations.

Figure 2:
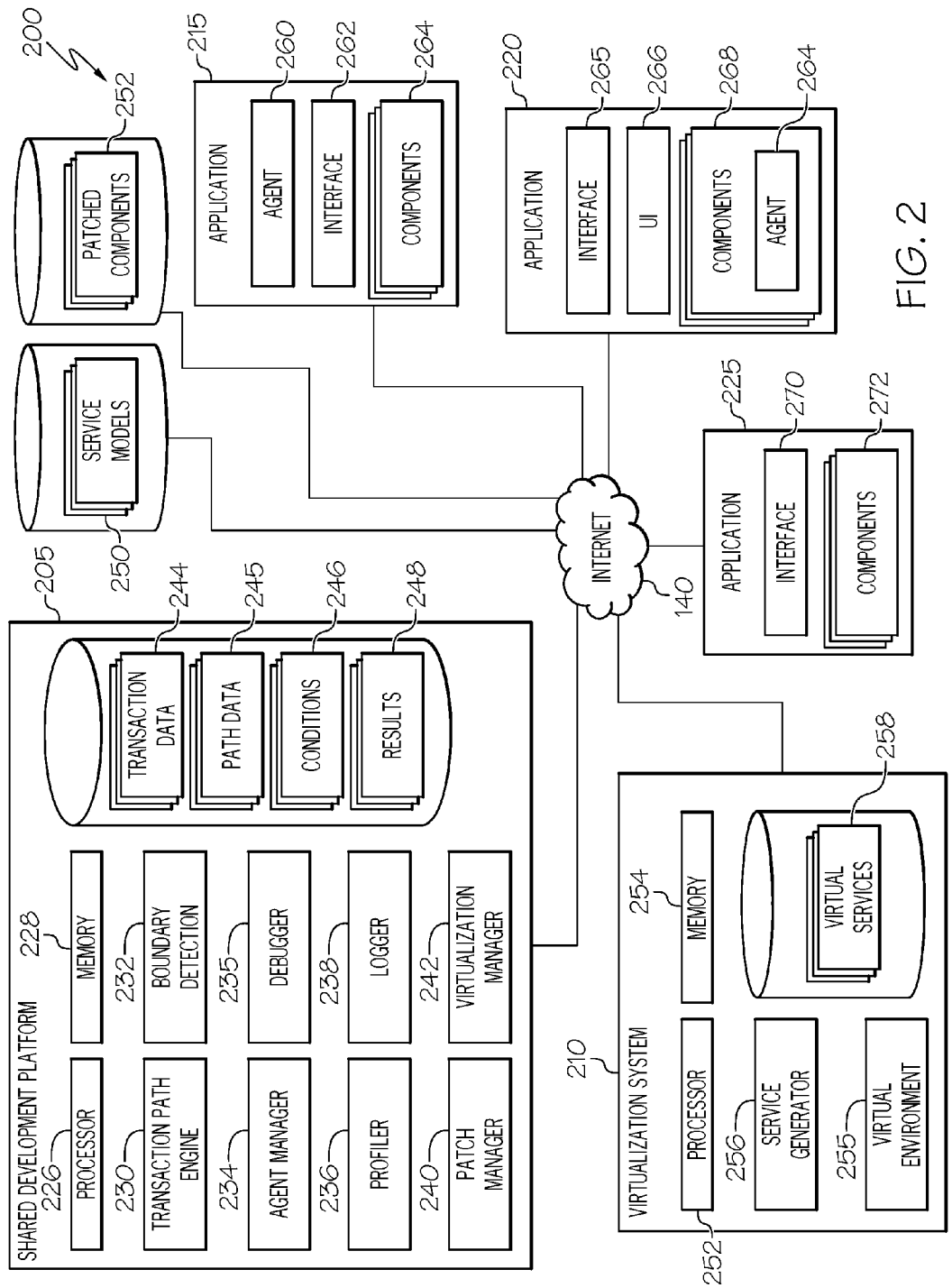
FIG. 2 is a simplified block diagram of an example computing system including an example shared development platform in accordance with at least one embodiment.

At least some of the systems described in the present disclosure, such as the systems of FIGS. 1 and 2, can include functionality that at least partially remedy or otherwise address at least some of the above-discussed example deficiencies and issues, among others. For instance, a shared development platform can be provided that leverages intelligence garnered by a transaction analysis system that can be used to detect boundaries between the various sessions, transactions, processes, and threads running contemporaneously in a multi-component software system. A variety of different boundaries can be defined by users, each boundary indicating a respective set of one or more conditions that are to apply if a given transaction, transaction fragment, process, and/or thread is to "fall" within the boundaries. One or more development activities can be triggered to be performed selectively on the specific transactions, processes, and threads that are determined to fall within a corresponding boundary (or "transaction boundary"). This can allow a single user (e.g., developer) to define logical boundaries in which a given development activity or system characteristic is to apply, without interfering with the development activities of other users who may be accessing or using the same software component(s) in connection with their own development activities. Thus, the shared development platform can enable logical, dedicated "sandboxes" in which an individual user (or subset of users) in a development team can perform various development activities, among other examples and potential benefits.

Turning to the example of FIG. 2, a simplified block diagram 200 is shown illustrating an example environment 200 including a shared development platform 205, a virtualization system 210, and one or more services, database management systems, programs, or applications (referred to in this example collectively as "applications" (e.g., 215, 220, 225). The systems 205, 210, 215, 220, 225, etc. can interact, for instance, over one or more networks 140. In one example implementation, a development platform 205 can include one or more processor devices (e.g., 226) and one or more memory elements (e.g., 228) for use in executing one or more components, tools, or modules, or engines, such as a transaction path engine 230, boundary detection engine 232, agent manager 234, and one or more development tools. For instance, in the example of FIG. 2, the development platform 205 can provide a suite of development tools including examples such as a debugger 235, profiler 236, logger 238, patch manager 240, and virtualization 242, among other potential tools and components including combinations or further compartmentalization of the foregoing. In some implementations, development platform 205 can be implemented as multiple different distinct systems including, for example, varying combinations of the foregoing components and tools (e.g., 230, 232, 234, 235, 236, 238, etc.) and accompanying data (e.g., 244, 245, 246, 248).

In one example, test system 205 can include a transaction path engine 230 configured to inspect a particular application (e.g., 215, 220, 225) or combination of co-functioning applications (e.g., 215 and 220) to identify one or more transactions involving the application(s) as well as the respective software components (e.g., 262, 268, 272) of the applications (e.g., 215, 220, 225) invoked and utilized within a broader software system and software transactions. Information gathered from monitoring or inspection of the transaction can be stored in transaction data 244. Further, the flow path of the transactions can additionally be identified and flow path data 245 can be generated describing the flow between software components (e.g., 262, 268, 272) and the respective contributions, operations, processes, or transaction fragments of the applications within the flow.

In some implementations, transaction path engine 230 can operate cooperatively with an agent manager 234 interfacing with or otherwise managing one or more instrumentation agents (or "agents") (e.g., 258, 264) deployed on one or more applications (e.g., 215, 220) for use in aiding the monitoring of performance of various components (e.g., 256, 264) of the applications. In some cases, a single agent (e.g., 258) can monitor operation of and transactions involving more than one software component and in other cases each software component (e.g., 268) can be instrumented with a respective agents (e.g., 264). Agents (e.g., 258, 264), in either implementation, can be software-implemented agents that are configured to provide visibility into the internal operations of each instrumented component (e.g., 256, 264, etc.) as well as the data being communicated into and out of each component. Each agent can be configured, for example, to detect requests and responses being sent to and from the component or application in which that agent is embedded. Each agent (e.g., 258, 264) can be configured to generate information about the detected requests and/or responses and to report that information to other services and tools, such as agent manager 236, virtualization system 210, transaction path engine 230, and one or more development tools (e.g., 235, 236, 268, 240, 242, etc.). Additionally, each agent can be configured to detect and report on activity that occurs internal to the component in which the instrumentation agent is embedded. Collectively, such information can be embodied as transaction data generated by the agents (e.g., 258, 264) to report characteristics of the components' operation and transaction observed by the respective agent. Transaction data from an agent can be marked to identify the agent from which it originates.

In response to detecting a request, response, and/or other activity of a transaction to be monitored, each agent (e.g., 258, 264) can be configured to detect one or more characteristics associated with that activity and/or the monitoring of that activity by the agent. The characteristics can include a frame identifier, which identifies a message, with respect to the agent, sent by the agent to a managing service, such as agent manager 236, embodying at least a portion of the transaction data sent from the agent to report the characteristics observed by the agent. For instance, frames can include a parent identifier, which identifies the requester software component that generated the request sent to the component or sub-component monitored by the instrumentation agent; a transaction identifier, identifying the transaction, with respect to the component or sub-component being monitored, such as transactions between components carried out through communications and calls made over one or more network connections; a session identifier (or token) to propagate session information detected in one portion of the transaction throughout the transaction; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., development tools 235, 236, 238, 240, 242, etc.) communicatively coupled to the agent or agent manager. In some embodiments, each instrumentation agent collects information to form a message, also referred to herein as a frame, which describes characteristics associated with either or both a detected request and a detected response to the request in a transaction. In some instances, an agent can return transaction data in a frame to describe both the request and its corresponding response as observed at a software component monitored by the agent. In such cases, the respective agent can wait for the response corresponding to the request to be generated and sent before sending the frame to another tool or engine (e.g., 234, 235, 236, 240, 242, etc.) making use of the information in the frame.

Additionally, agents can monitor and report characteristics independently for each transaction in which its respective monitored component(s) (e.g., 262, 268, etc.) participates. In some cases, an agent can send transaction data for each fragment of a transaction observed by the agent. For instance, separate frames can be sent for the request and corresponding response. An agent manager 234 can receive frames containing the transaction data and determine which requests and responses belong to which transaction fragments and transactions. Further, the transaction path engine 230 can utilize these relationships to stitch transaction fragment information collected from potentially multiple frames from multiple agents, to develop a chain of transaction fragments that map to the actual flow of the transaction as it traverses multiple software components of the system (and potentially multiple agent domains).

In some embodiments, all or some of agents (e.g., 258, 264) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 258, 264) can be configured to monitor individual threads by monitoring the storage used by each thread (i.e., the thread local storage for that thread), variable values utilized in the thread, functions called in the thread, among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like. Agents can likewise identify and focus monitoring on specific processes and other quanta of software components and their execution (i.e., other than or in addition to threads).

As noted above, in some implementations, one of the characteristics that can be collected by agents (e.g., 258, 264) can include timing information, such as a timestamp, that indicates when a particular request was received or when a particular response was generated. Such timing information can be included in transaction data 244 and be used, for instance, by transaction path engine 230, to identify that frames, including frames received from different agents, are related to the same transaction. In some implementations, timers used by agents (e.g., 258, 264) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 258, 264) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 258, 264) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans, etc.). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

In implementations utilizing one or more agent managers (e.g., 234), multiple agents (e.g., 258, 264) can communicate with single agent manager 234 via a messaging system. In some cases, agents monitoring components hosted on distinct, or remote, devices can communicate over one or more networks with one or more centralized, or semi-centralized, agent managers 234. In one example implementation, agents (e.g., 258, 264) can communicate with an agent manager 234 using a messaging system such as Java™ Message Service (JMS), among other examples. For instance, agent manager 234 can create a messaging system topic for each transaction (referred to herein as a transaction frame (TF) topic) and subscribe to that TF topic. The instrumentation agents, upon startup, can broadcast their existence to each other and/or to agent manager 234. The agents (e.g., 258, 264) can then get the TF topic from agent manager 234 and begin publishing messages onto a message bus on that TF topic. Agent manager 234 can monitor the published messages and determine whether those messages relate to the current TF topic. As needed, agent manager 236 creates new TF topics for new transactions. In other examples, agents (e.g., 258, 264) can alternatively communicate with agent manager 234 using techniques other than those involving messaging systems. For example, agents can write information to shared data repository (e.g., a database associated with the test system) using database commands, and an agent manager 234 can monitor those database commands to detect new information, among other examples.

As requests and responses progress through one or more systems (e.g., 215, 220, 225), additional characteristic information can be captured, for instance, as transaction data 244. For example, the operation of one or more software systems (e.g., 215, 220, 225) engaged in one or more transactions can be monitored, for instance, by one or more agents (e.g., 258, 264) and the agents can capture characteristic information associated with requests in the transaction (e.g., the time at which the request was received, the sender of that request, the time at which corresponding requests were sent to a database and/or other service, etc., whether the request is associated with a session, how much data was exchanged, the identity of the communication channel used in the request or response, and the like) and the corresponding response, and generate transaction data 244 (e.g., frames) embodying the information. Agents, in some instances, can report transaction data to an agent manager 234 and additionally (or alternatively) store at least a portion of the transaction data at the agent.

As noted above, a transaction path engine 230 can determine and track the specific path, or flow, taken by a given transaction based on transaction data 244 captured and reported by agents observing the transaction at the participating software components. The path can be determined as the transaction progresses in substantially real time, with some transaction data being returned as some transaction fragments complete (but before others finish or begin). The transaction path engine 230 can access and utilize transaction information in transaction data 244 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction or session (that includes multiple transactions).

In some embodiments, in order to group frames, or otherwise identify relationships between frames or transaction fragments, transaction path engine 230 (or another tool) can sort the frames based upon particular characteristics, such as timing information associated with and/or included within those frames, the presence of a common session token included in the reported transaction data frames, parent and child component identifiers, the size of requests sent/received, among other information. After being sorted, the frames can be arranged in ascending or descending order, with respect to the timing or parent-child information, etc. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information.

In other examples, frames can be sorted, for example, based on an amount of data exchanged, the identity of a particular communication channel or network connection used, addresses of the receiving and sending components, the identification of the particular agents that provided the frames, etc. For instance, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 230 can order, or stitch, the frames to define a chain or order of transaction fragments within a given transaction or set of instances of a similar transaction. The stitching of the frames can be based on determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples. Attributes of one transaction fragment can be imputed to other transaction fragments and/or a transaction as a whole based on the determined relationships between corresponding frames describing the component fragments of a transaction.

In addition to being able to use relationships or correlations to predict or determine a stitching or flow path of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation) have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples. Root nodes can be considered to represent the furthest "upstream" component in a flow, while leaf nodes represent the further "downstream" components in the flow.

A transaction path engine 230 can utilize and correlate transaction data 244 generated in part by one or more agents (e.g., 258, 264) to determine one or more transaction flow paths. The transaction path engine 230 can generate and maintain path data 245 describing the determined flow paths involving one or more software components (e.g., 256, 264, 266) or one or more software systems or applications (e.g., 215, 220, 225). Other tools, as well as other systems, can consume path data 245 to perform additional activities and services in support of tests and development of software systems (e.g., 215, 220, 225) described in the paths. For instance, graphical representations of the transaction paths can be generated from the path data to illustrate the involvement of a set of software components and how the transaction progressed through the set of software components. Additionally, the graphical representation can present representations of characteristics defined in the transaction information (e.g., characteristics of requests and responses in individual transaction fragments, characteristics of individual software components, etc.).

Transaction data (e.g., 244) can also be used to determine that one or more boundary conditions (e.g., 246) have been satisfied triggering targeted application of one or more development tools on transactions, fragments, and/or threads falling within the transaction boundary defined by the conditions (e.g., 246). As noted above, agents (e.g., 258, 264) can report at least some transaction data 244 in real time as it is collected to identify that a transaction, transaction fragment, thread, or set of transactions or threads (including downstream threads and transaction fragments that have yet to begin and/or complete) fall within a transaction boundary. Boundary detection logic 232 can receive or otherwise access transaction data as it is reported by one or more agents (e.g., 258, 264) and can identify characteristics reported in the transactions that are included as conditions in one or more transaction boundary definitions (e.g., embodied in condition definition data 246). Boundary definitions (e.g., 246) can further identify one or more development tools (e.g., 235, 236, 238, 240, 242) that are to triggered when transactions (or portions of transactions) are determined to fall into one of the defined transaction boundaries. The boundary detection engine 232 can then interface with or otherwise control the invocation of these corresponding detection tools in response to detecting that transactions fall within one of the defined transaction boundaries.

A variety of different transaction boundaries can be defined for a single system. The system may include a number of different sub-systems, or tiers, and some of the boundaries may target development tasks to be performed on particular sub-systems or software components in the overall multi-tier software system. Some of the conditions may only be determinable based on the intensive view of the overall transaction(s) provided through a collection of agents instrumented throughout the software system. In some cases, determining that a condition applies to a particular transaction, transaction fragment, or thread may be dependent on another agent on another software component and/or server detecting the condition and the transaction path engine (or boundary detection) logic determining that an earlier (e.g., upstream) detected transaction characteristic triggers inclusion of various downstream transactions or transaction fragments within the transaction boundary. Indeed, in some cases, without the information provided by certain upstream agents, it may not be possible to determine that other downstream software transactions or threads are to fall within a transaction boundary and have corresponding development activities performed upon them.

As an example, a particular user may interface with a frontend system to send a request to the frontend system. The frontend system, in turn, may participate in transactions with various backend systems in connection with generating a response to the request. The backend systems, too, may transact with additional backend systems further downstream from the original request. In this example, a transaction boundary may be defined for the invocation of a modified version of a particular software component, such as a patched version of the particular software component or a virtual service simulating operation of the modified version, among other examples. However, the frontend system may be the only system that receives data interpretable to identify that the transaction involves a session of the particular user. An agent at the frontend system can capture session-identifying information and cause a session token or identifier to be appended to data in downstream transactions in the session or to transaction data generated by agents monitoring the downstream software components. Accordingly, the transaction data received from the agents monitoring software components involved in transactions of the session can be used to identify downstream (or child) transactions and corresponding threads that are also included in the session, triggering the selective application of a patch or virtual service, among other example implementations. Activation is selective in that other contemporaneous transactions and threads not identified as belonging to the particular user's session (and outside the relevant transaction boundary) do not trigger the conditional utilization of a patch or virtual service and interact instead with the native or actual version of a particular applications and software components (e.g., that do not include the features, functionality, or characteristics of the patch or virtual service).

Transaction boundaries can be defined for a variety of different development tools (e.g., 235, 236, 238, 240, 242) with differing conditions (e.g., 246) defined for triggering selective deployment of the tools on the various different software components in the system. Indeed, users can define transaction boundaries to enable the user to "carve out" that portion of the shared software system (under development) managed by the developer user, such that the user's development activities do not interfere with other development activities of other users of the system (or even, in some cases, the production operation of the system).

In one example, development tools for which transaction boundaries can be defined may include a debugger 235, profiler 236, logger 238, patch manager 240, and virtualization manager 242, among potentially other development tools. A debugger can be used to debug code of the various software components included within the software system. For instance, a debugger 236 may run based on breakpoints defined in the code. In one example, transaction boundaries can be defined as conditions for conditional invocation of specific breakpoints to be used in debugging of the system. A profiler 236 can perform software profiling on a software component, for instance, to identify the usage of particular instructions, the frequency and duration of various function calls, etc. during operation of the software components. In the case of profilers, example transaction boundaries can be defined to filter which threads of a software component or system are to be profiled during a profile session. Additionally, or alternatively, transaction boundaries may also be defined to cause a collection of diverse software components or transactions/transaction fragments to be selectively profiled during a profiling session, for instance, to generate profile results that describe operation of a chain of transactions in a session, a collection of instances of a particular type of transactions, etc. Similarly, a logger 238 can be utilized to log events that occur during execution of a software system and transaction boundaries can be similarly defined to selectively log only a particular portion of the transactions within a system of interest to an author of the transaction boundary, among other examples.

Continuing with the above example, development tools can assist developers in testing or observing the hypothetical implementation of certain changes to the code and/or functionality of various software components within the broader system. Applying such changes can be particular disruptive within a shared development project. A patch manager 240 can be used to selectively apply a patch (or code modification) to one or more software components in the system under development. For instance, alternative versions (e.g., 252) of one or more software components (such as patched components 252) can be maintained, which can be selectively accessed and employed (e.g., by the patch manager 240) in lieu of the native or current version of the software component. A transaction boundary can be defined such that a patch to a particular software component is only applied selectively when the software component is involved in a transaction falling within the transaction boundary, among other examples. In other implementations, rather than selectively applying patches to a particular software component to test a hypothetical change to the particular software component, (or test the response of another software component when it interacts with the particular software component with the change), a virtualized instance of the particular software component, or virtual service (e.g., 258) can be provided that simulates the operation of the particular software component were it to have the change (e.g., based on a corresponding service model 250 hosted locally at or remote from the shared development platform 205). Thus, the virtualized instance can be selectively invoked (e.g., in connection with a corresponding transaction boundary) to replace the actual software component in transactions within the transaction boundary to simulate the change, among other examples.

In development platforms (e.g., 205) including a virtualization development tool (e.g., 242), a supporting virtualization system (e.g., 210) may be provided separate from (or, alternatively, integrated with) the development platform 205. The virtualization system 210, in example, may include one or more processor devices 252, memory devices 254, and other hardware and software components including, for instance, a virtual service generator 256, virtual environment 255 for provisioning and executing virtual services, among other examples. A virtualization system 210 can be used to generate and manage virtual services (e.g., 258) from corresponding virtual service models 250 that model software components and systems. Such virtual services 258 can be used as stand-ins (e.g., for particular software components (e.g., 264, 268, 272) in tests and other development tasks involving the real-world systems modeled by the virtual service. Virtual services 258 can be generated by virtualization system 210 (e.g., using virtual service generator 256) based on detected requests and responses exchanged between two or more software components or systems (as described and modeled in a corresponding service model 250). Such request and response information can be captured, for instance, by the same agents (e.g., 260, 264) in transaction data 244 and can be used to generate virtual service models 250 (e.g., by the virtualization system or another tool). Virtual services 258 generated from the service models 250 can capture and simulate the behavior, data and performance characteristics of complete composite application environments, making them available for development and testing at the request of a user or system and throughout the software lifecycle, among other advantages.

A virtualization system 210 can include functionality for the creation of complete software-based environments that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 255 implemented, for instance, within on-premise computing environments, in private and public cloud-based lab, using virtual machines, traditional operating systems, and other environments, among other examples.

A virtual service generator 256 can use the identified set of expected requests and responses defined in service models 250 to provide one or more virtual services simulating operation of a modeled particular component. Service models 250 can further support stateful virtualization and imitate a series of particular requests in a session, such as a session driven by a human user of the client application providing the simulated inputs to the particular component, among other examples. In one example, virtual service generator 256 can be provided to instantiate virtual services from service models 250. In some cases, virtualization can involve the provisioning of a virtual service, such as described in U.S. Pat. No. 8,112,262, incorporated by reference herein. In some instances, virtualization system 210 can utilize agents (e.g., 260) to provide the responses of a virtualized dependency. For example, service generator 256 can communicate with agents provisioned on the consuming system to intercept particular requests from the consuming component and generate synthetic responses consistent with a transaction defined in a corresponding service model 250 that mimics the response that would be received from a live version of the dependency. In other words, synthetic responses are generated by virtual services standing-in for real-world services or components, and the synthetic responses are to simulate responses that these real-world services would generate in response to a given request. The responses are "synthetic" in the sense that they are not the actual responses of the real-world component, but are instead the simulated responses of a virtual service based on observations of how the real-world components would generally behave in response to various requests.

In some examples, service models (e.g., 250) can be generated based on monitored requests and responses between two or more software components or systems (such as components 264 of application 215 and components 268 of application 220, etc.). A virtualization service generator 256 can detect a request of a component that is to be virtualized and identify each transaction, defined in a service model (e.g., 250) corresponding to the virtualized component, that corresponds to a request of that type and similar attributes. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, virtualization can support virtualizing requests and responses in a variety of different protocols as well as the pertinent information from each. Thus, service models 250 can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 250 can be used as the basis of virtual services modeling the software components providing the requests and/or responses modeled in the service models 250. Virtual services can capture and simulate the behavior, data and performance characteristics of complete composite application environments, making them available for development and testing at the request of a user or system and throughout the software lifecycle, among other advantages. In some cases, virtual services can be instantiated from a service model modeling a single component to virtualize a single, particular component in a composite environment. In other cases, a composite virtual service can be instantiated from a composite service model modeling multiple correlated components within the composite application environment. Virtual services, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment implemented, for instance, within on-premise computing environments, agents, in private and public cloud-based lab, using virtual machines, traditional operating systems, and other environments, among other examples.

As noted above, in some implementations, when a service model is used to instantiate a virtual service, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model 250 can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

In the case of composite virtual services, a request sensitive value may be one of the values that is correlated across multiple component transactions within a composite transaction. For instance, the value of "UserID" may be included in responses generated by the modeled software components or may be otherwise maintained or used by multiple software components in the corresponding composite transaction context. In other cases, values may not be request sensitive or dependent and "dummy" data can be generated by the virtual service logic for the values that are correlated across multiple component transactions modeled by the composite service model. In either case, when a value is assigned by the virtual service in the virtualization of one of the components modeled by a composite service model, the same or similar value, if correlated across multiple components, may be propagated throughout the virtualization of the remaining portions (i.e., components and transactions) of the composite transaction, such that state of data across the multiple transactions is automatically and realistically maintained.

A service model 250 can include still additional information to support additionally functions of a virtual service 258. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples. In the case of a composite virtual service, interrelationships and interdependencies between timing, resource access windows, etc. by the multiple transactions and components within a composite transaction can be modeled and virtualized in a composite virtual service, among other examples.

As noted above, software systems and their constituent software components can include functionality for transacting with one or more other systems and components in a multi-tiered system. In some cases, software components can transact with other components over one or more networks (e.g., 140) (using corresponding network ports, sockets, etc.), APIs, or other interfaces (e.g., 262, 265, 270), among other examples. Some applications can include front-end, user-facing services and applications that further include user interfaces (e.g., 266) for presenting at least some of the outputs and results of a transaction to a user. Such user interfaces can further accept one or more inputs or request values provided by a user, among other examples. Applications, software systems, and software components can perform any variety of tasks or services and be implemented using potentially any suitable programming language, architecture, and format.

Figure 3:
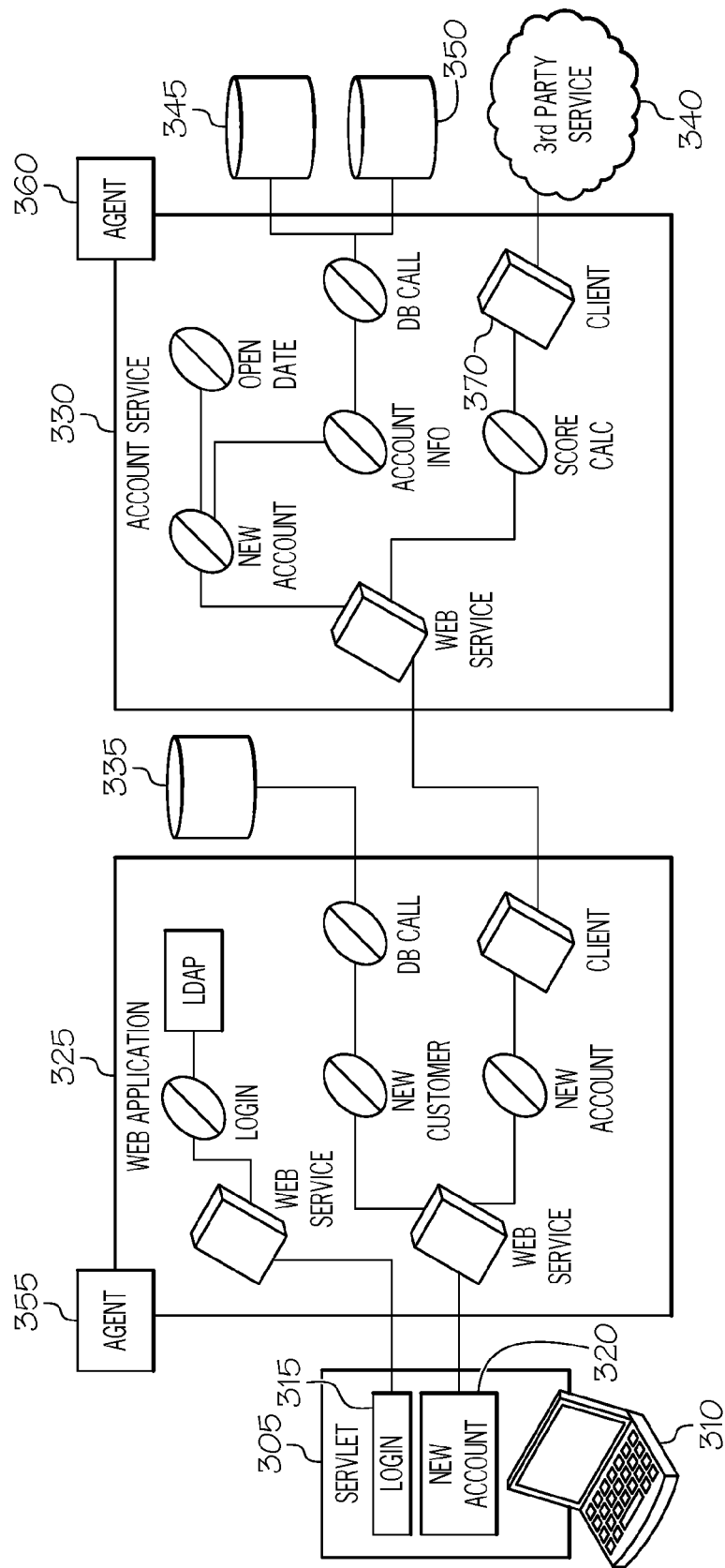
FIG. 3 is a simplified block diagram of an example system in accordance with at least one embodiment.

Turning to FIG. 3, a simplified block diagram is shown representing, for purposes of illustrating certain principles of this disclosure, an example software system and composite software components capable of engaging in one or more transactions. It should be appreciated that this particular system (and the transactions in this example) represents but a single example, and that a potentially unlimited variety of alternative systems, transactions, and architectures may make be monitored, analyzed, have defined transaction boundaries, and otherwise utilize the general features and principles outlined herein.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. The web application 325 can potentially interact with multiple different users in multiple different concurrent session. Accordingly, the web application 325 can also maintain session identifiers, cookies, or other data to track sessions with the users. Other components of the system (e.g., backend service 330), however, may not maintain session or maintain different session data that abstracts the identity of the original requester (e.g., user), among other examples.

Figure 4A:
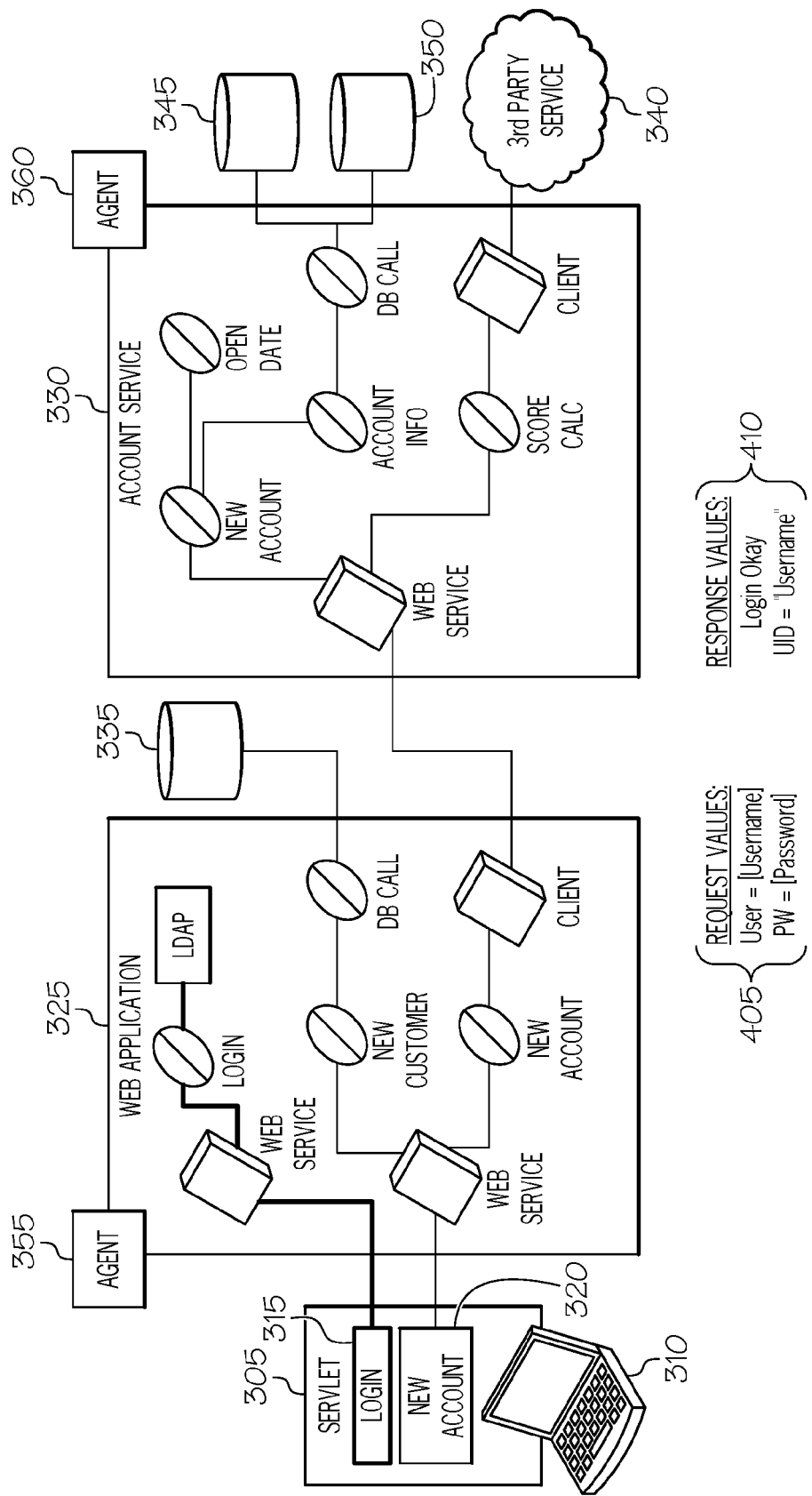
FIGS. 4A-4F are simplified block diagrams illustrating transaction flow paths involving the example system of FIG. 3 in accordance with at least one embodiment.

FIG. 4A illustrates the flow path of an example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
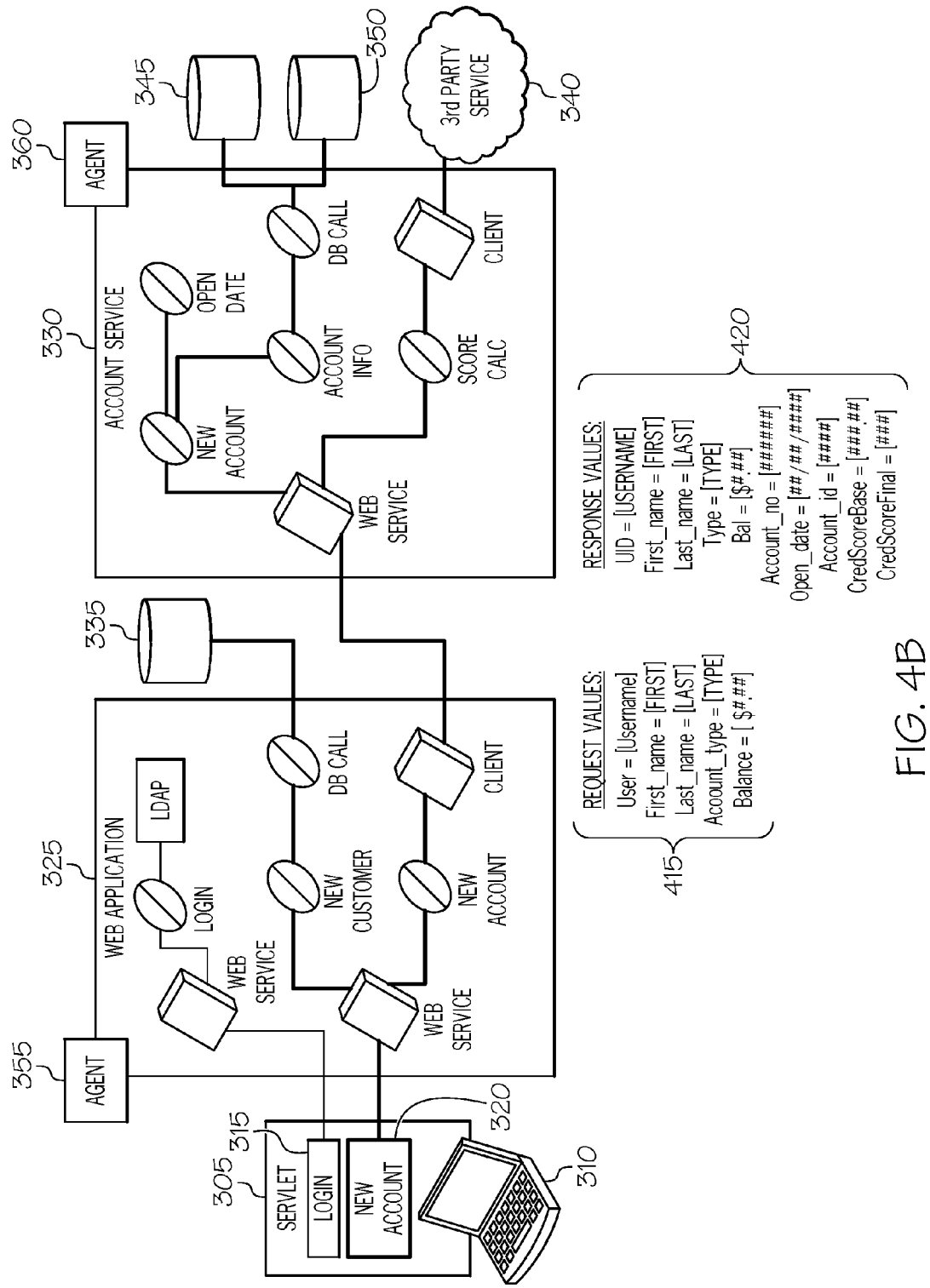

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415. Such response values (e.g., account number, account open date, account ID, credit score) that are at least partially independent of request values 415 of the transaction can be considered dynamic values that are not easily derivable or predicted from the request values 415.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
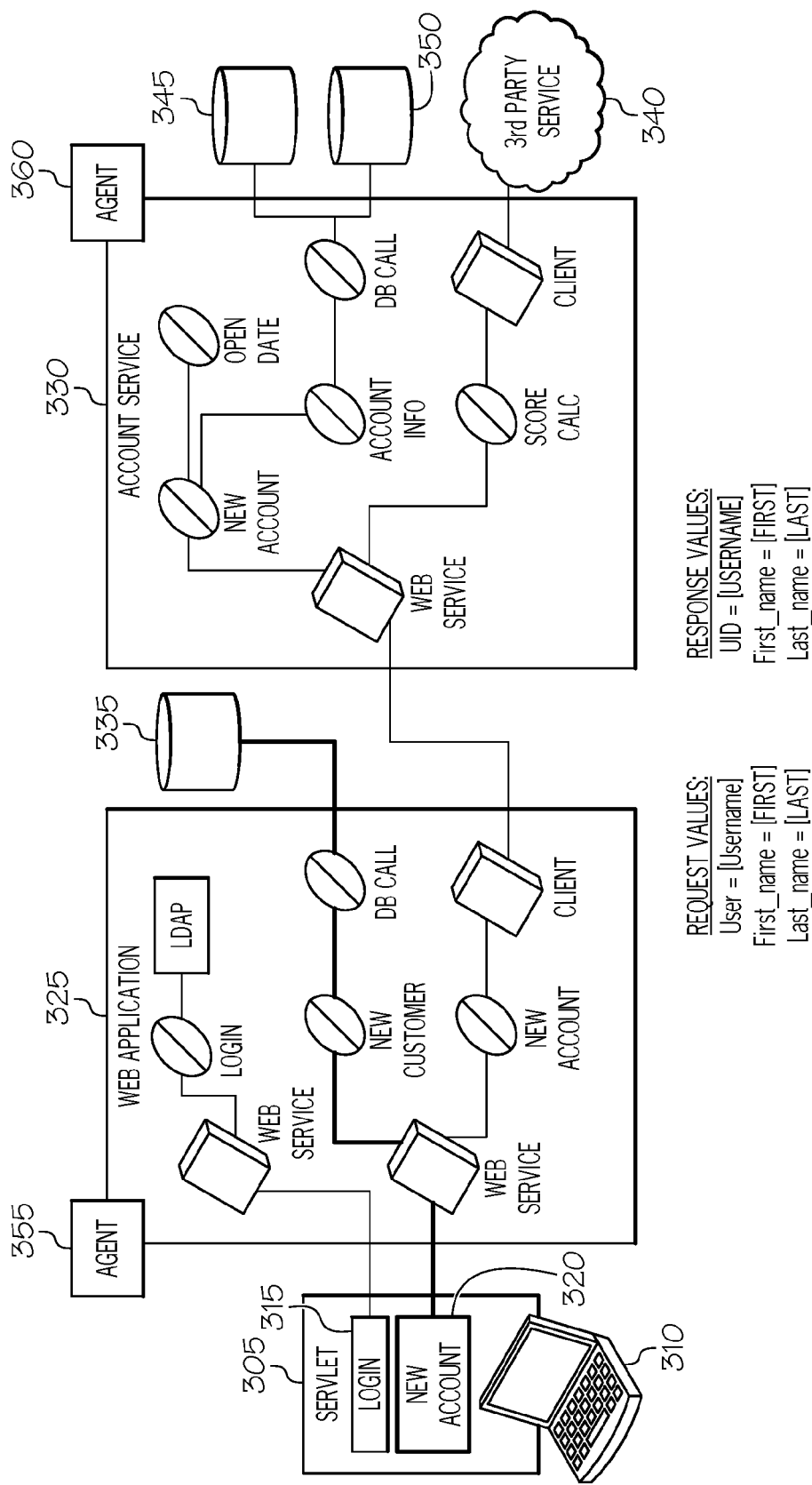

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

Figure 4D:
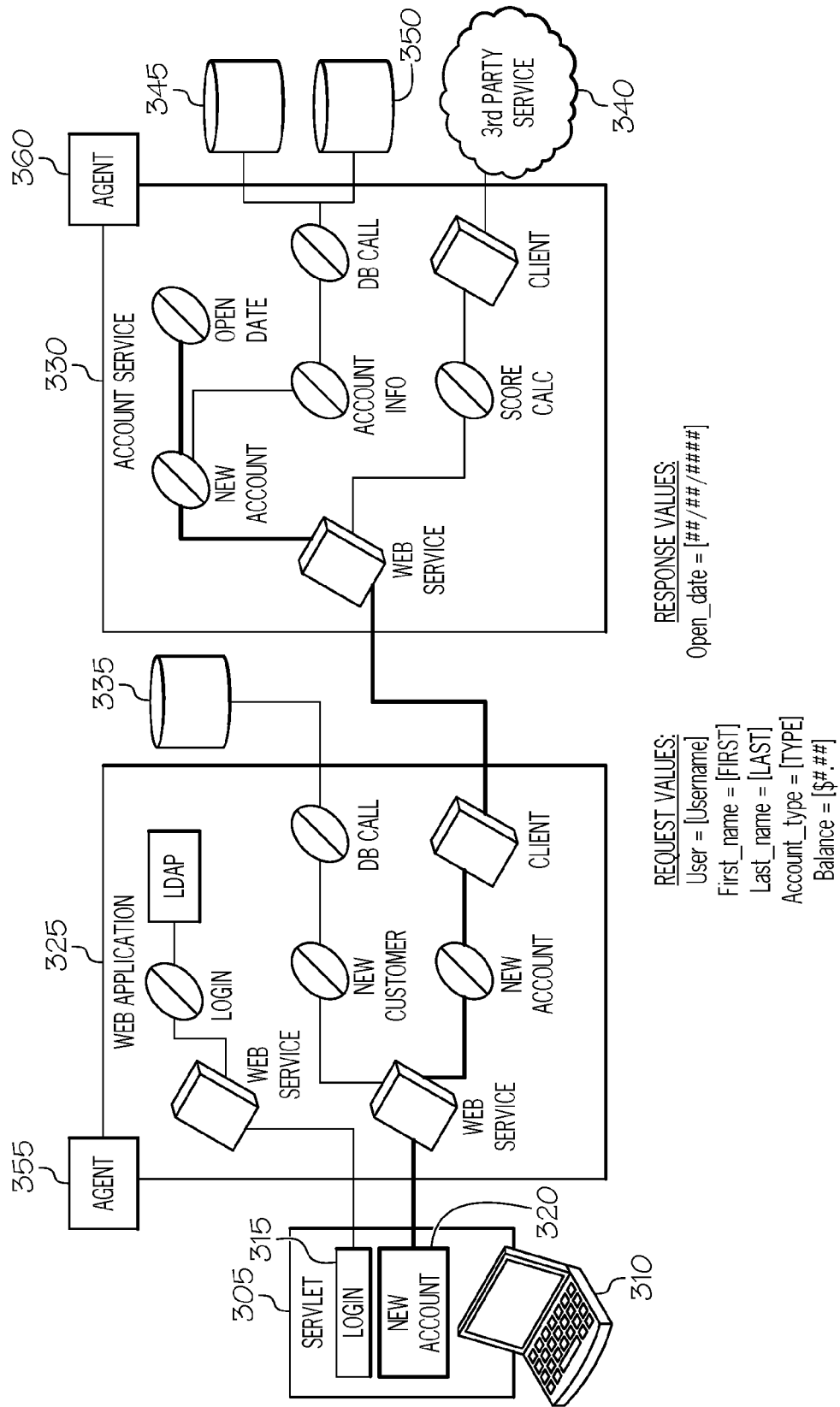

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
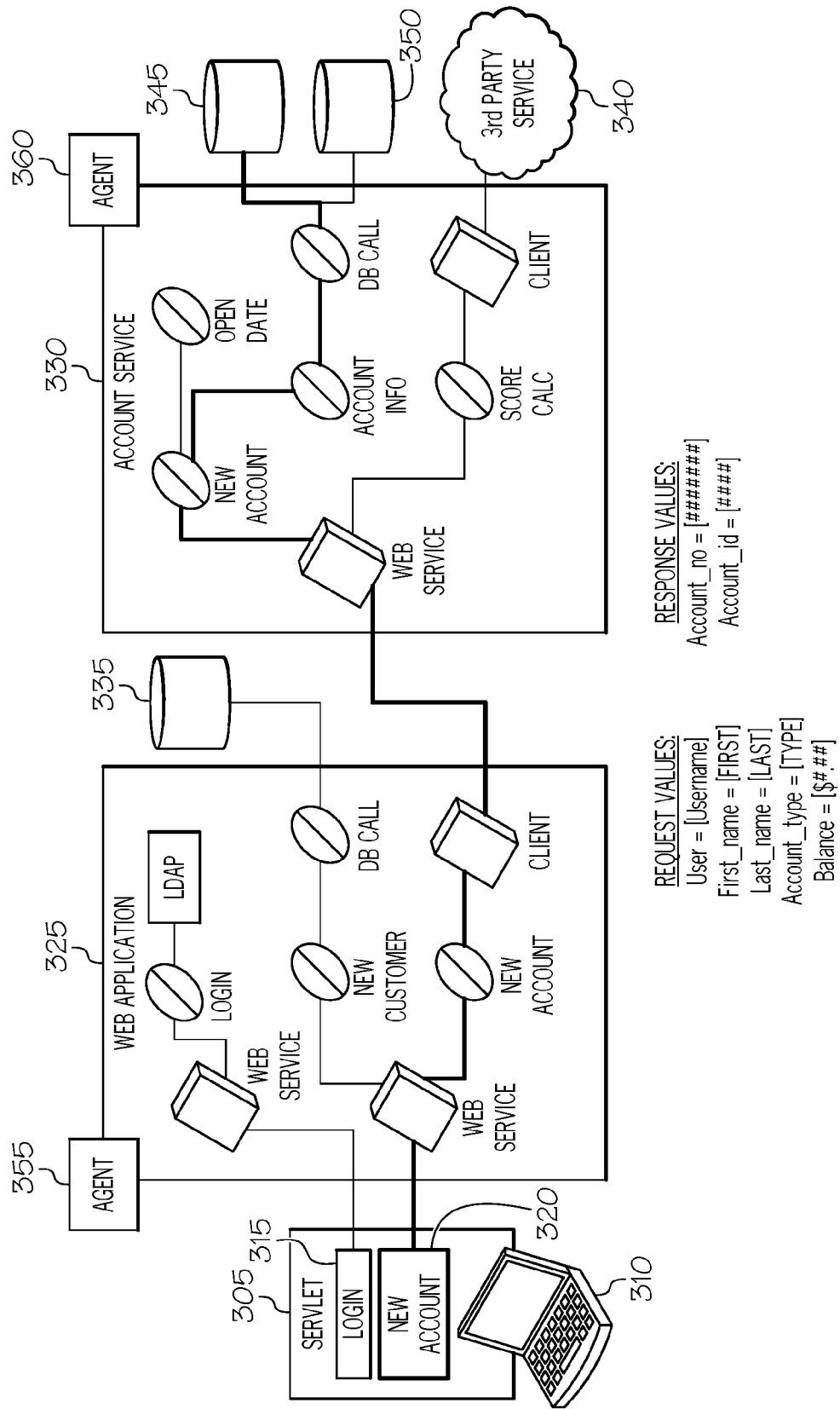

The example of FIG. 4E illustrates another example transaction flow path branch, in this case, relating to the chain of requests resulting in the generation of response values Account no (e.g., providing the new account number generated for the account) and Account id (e.g., corresponding to a database record for the new account), generated, for instance, by an unmonitored software component, such as database 345 or other data store, external to monitored software systems 325, 330, among other examples. The values of Account no and Account id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
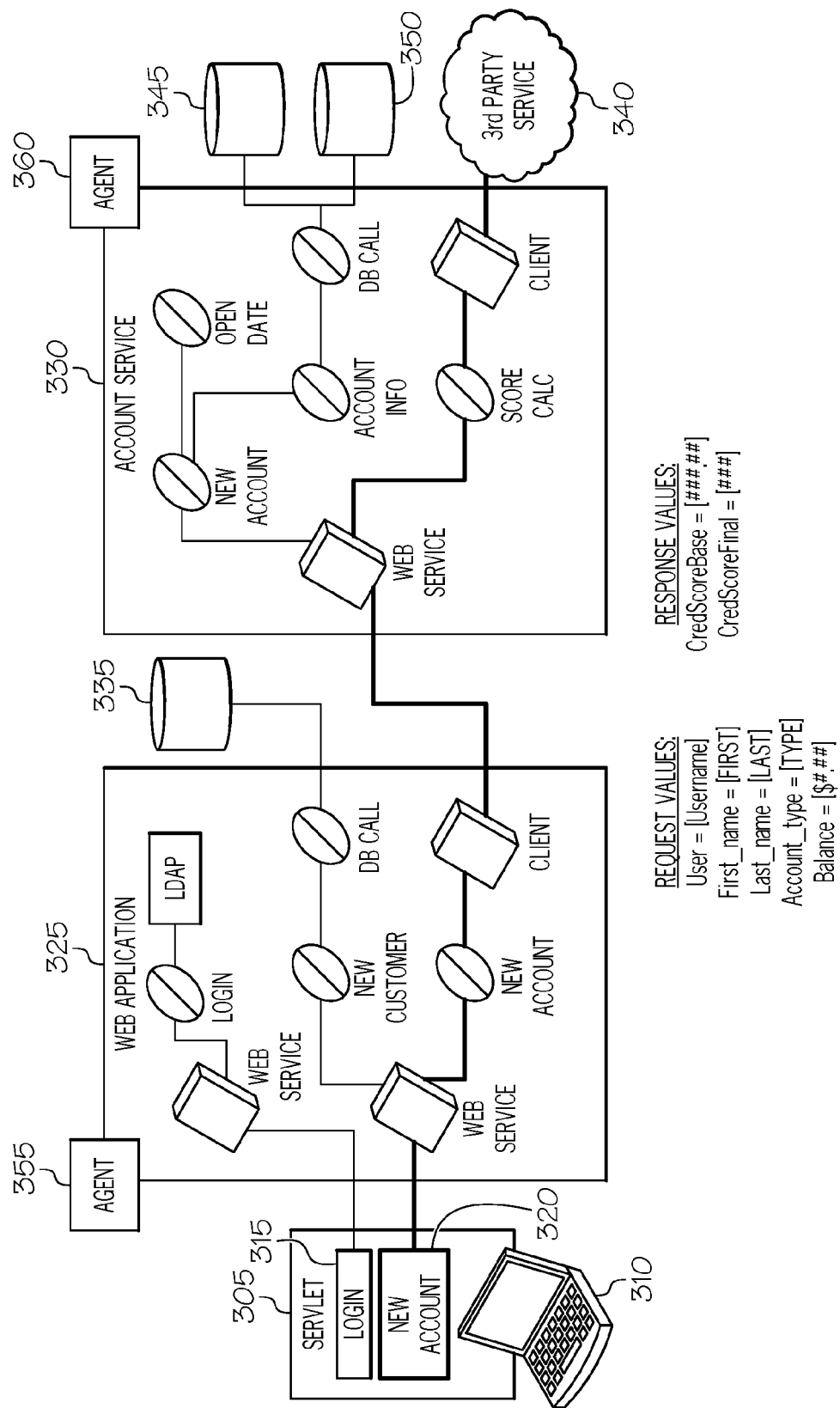

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

In one example implementation, through transaction flow data (e.g., 245) generated by the transaction path engine 230, the nature of a particular response value and its dependency on one or more request values can be identified. For instance, transaction data can be correlated from consecutive transaction fragments and identify, for instance, from clock or timing data, or through a comparison of data included in requests and responses, that a particular response value corresponds to a particular request value. Additionally, characteristics detected at one component in a set of software components involved in a transaction flow (or a particular thread in the transaction flow) can be attributed to other components (and/or threads running on the components) based on determining that the components and/or threads are included in the same transaction flow. For instance, a session identifier detected by an agent (e.g., 355) during a session involving a request of web application 325 by a particular user can identify that the session pertains to the particular user. Using transaction data, downstream threads (e.g., from agents 355, 360), such as running on account service 330, can be determined to be within the same transaction or session causing these downstream threads to also be associated with the particular user (e.g., even when the downstream software component (e.g., 330)) is unaware of the particular user's involvement in the session. In the example of FIGS. 3-4F, the particular user may be a user different from the "user" identified in [Username], [FIRST], [LAST], etc. For instance, the user may correspond to a developer who performs an instance of the Login or New Account transactions in connection with testing or development of the software system illustrated in FIG. 3 (e.g., using test values for [Username], [FIRST], [LAST], etc., among other examples Linking together a set of distinct (and potentially disparate) transactions, transaction fragments, threads, software components, etc. on the basis of user session using agent-generated transaction data and determined transaction flows can be a powerful tool to support filtering development activities. For instance, development activities on a shared software system or component can be filtered on the basis of individual developer users (or particular groups of developer users). For example, a developer-user can initiate a session in connection with a particular development activity. The user session may not explicitly identify the developer-user, but because the user session originates from the developer-user, the session can be identified as associated with the developer-user. In one example, at least one of the software components utilized in the session may be session-aware and an agent instrumented on this software component can identify that the transaction, or session, is a session to be associated with the particular developer-user. The agent and/or agent manager can tag transaction data describing transaction fragments in this session (as observed at this software component) with a token or other identifier to indicate that the transaction fragment is to be associated with the particular developer-user. For instance, an agent can possess logic to identify the type of session identifier (e.g., session token, cookie, etc.) used by the software components or application it is monitoring, allowing the agent to detect the presence of the cookie and tag corresponding transaction data (and even outbound requests) with a tag identifying the session, among other examples. Subsequent transactions in the session, as observed at this software component can be likewise identified. Further, through stitching (e.g., the determination that one transaction fragment is related to an immediately subsequent or previous transaction fragment in a transaction flow, can cause subsequent and/or previous transaction fragments to be likewise tagged as included in the user session and associated with the particular developer-user. This can be useful, for instance, when at least some portions of the software system are shared and potentially multiple different users (and user sessions) are on-going during the particular developer-user's session and use of the shared software system.

Figure 5:
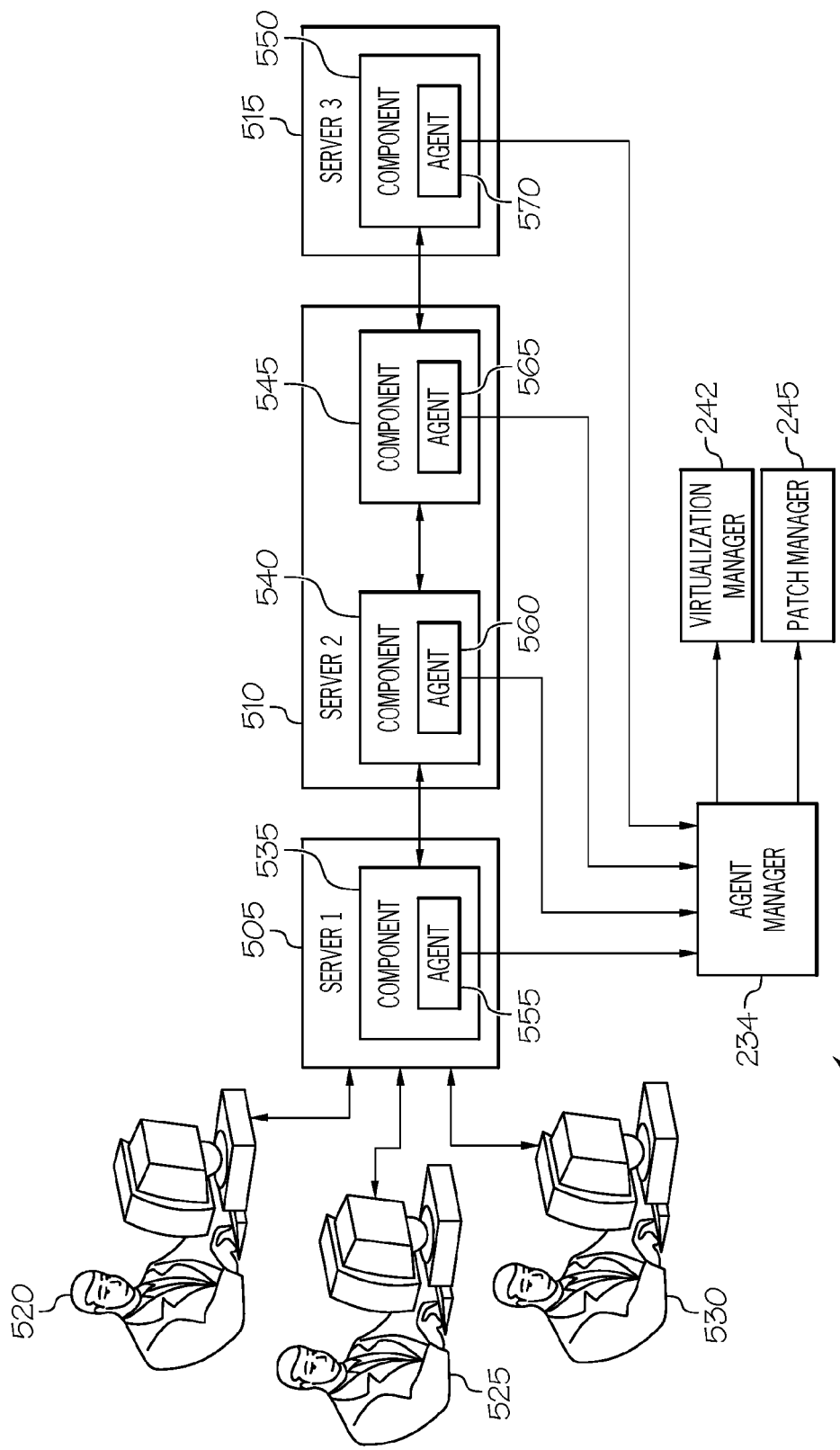
FIG. 5 is a simplified block diagram illustrating selective use of an alternative to a particular software component within a transaction.

Turning to FIG. 5, a simplified block diagram is shown illustrating selective application of a patch or selective invocation of a virtual service corresponding to one or more features or modifications to a component of a system involved in the development of a software system. Selective application of the patch or deployment of the virtual service can be based on detecting that a subset of transactions of a software component fall within a defined transaction boundary. In this example, the software system can be a multi-tier system including multiple server devices (e.g., 505, 510, 515) each hosting a portion of the composite software components (e.g., 535, 540, 545, 550) of the system. Agents (e.g., 555, 560, 565, 570) can be instrumented on each of the server devices (e.g., 505, 510, 515) and/or software components (e.g., 535, 540, 545, 550) to monitor operation of and transactions involving the software components (e.g., 535, 540, 545, 550). Multiple users (e.g., 520, 525, 530) may make use of the system. Such users can be multiple developer-users working together to perform development tasks on the system. In some cases, some of the users (e.g., 520, 525, 530) can be users interacting with a live production system. In either case, the users 520, 525, 530 can each be engaged in initiating and performing transactions on the system. In other instances, the transactions can be initiated by other systems or processes, such as a background process or test system, among other examples.

In the particular example of FIG. 5, each of the users 520, 525, 530 can each attempt, within a same window of time, to initiate transactions that utilize at least some of the same software components. For instance, two users (e.g., 520, 525) can initiate different types of transactions, but each type of transaction may utilize at least one of the same software components (e.g., 545) within the same window of time. Indeed, in some cases, the two transactions can involve two threads of the same software component (e.g., 545) that run at least partially concurrently. In some cases, the different transactions of the multiple users 520, 525, 530 may be different instances of the same transaction type and two or more threads at two or more of the software components (e.g., 535, 540, 545, 550) can at least partially overlap, among other examples.

Continuing with the above example, as the transactions take place, agents 555, 530, 565, 570 (e.g., similar to the agents discussed above) may monitor their respective software components and transactions (or transaction fragments) in which their software component participates and report transaction data to an agent manager 234 (or another component of a shared development platform). The transaction data may identify characteristics of the software components and/or threads involved in the transaction(s) as well as characteristics of messages (and their content) as sent during the transaction(s). Such characteristics can then serve as the basis of a transaction boundary used to trigger targeted development tasks, such as such as the selective invocation of a virtual service (e.g., using virtualization manager 242) or utilization of a patched software component (e.g., using patch manager 240) to replace another version of the software component, among other examples.

As illustrated in FIG. 5, transaction data can be sent to an agent manager (or another component of a shared development platform) capable of using the transaction data to determine relationships between parent and child transaction fragments and/or determine that distinct transactions belong to the same session. Determining such relationships between transactions can serve as the basis for determining commonality between the transaction data of related transactions across the multiple tiers (e.g., different servers and components) of the system. Accordingly, characteristics observable at one tier, software component, transaction, or transaction fragment in a transaction or session can be mapped to other components, transaction, or transaction fragments by association. This can allow portions of a transaction to be determined as falling within a transaction boundary (based on an identified characteristic) even when the characteristics was effectively invisible or unobservable at that portion of the transaction (e.g., a corresponding software component or transaction fragment downstream from the agent observing the characteristic).

Turning to FIGS. 6A-6B, simplified block diagrams are shown representing agent-generated transaction data collected during different windows of time. In the example of FIG. 6A, transaction data has been collected from the agents (e.g., 555, 560, 565, 570) instrumented on software components (e.g., 535, 540, 545, 550) involved in three instances of a particular transaction (e.g., "Transaction 1," "Transaction 2", and "Transaction 3") supported by a software system. Accordingly, transaction data can be received by the agents (e.g., 555, 560, 565, 570) during the monitoring of each of these three instances and an agent manager (and/or transaction path engine) can identify relationships between individual transaction data frames (e.g., 610*a*, 615*a*, 620*a*, 625*a*) received from different agents (e.g., 555, 560, 565, 570) relating to different transaction fragments and determine (e.g., using the principles described herein) that the transaction fragments and corresponding transaction data should be grouped together (e.g., at 605). Likewise transaction data 610*b*, 615*b*, 620*b*, 625*b* and transaction data 610*c*, 615*c*, 620*c*, 625*c* can be determined to "belong" to their respective transaction instances (e.g., Transaction B and Transaction C respectively) and can be similarly grouped (e.g., at 630, 635). In the example of FIG. 6A, a particular transaction boundary can be defined to indicate that all transaction fragments in an instance of the transaction having a particular characteristic (e.g., 640) should selectively include the use of a modified version of a software component (e.g., a program or application to which a patch or other update has been applied) or a virtual service in lieu of a standard, original, or current version of the software component. For instance, in the presence of characteristic 640 in a portion (e.g., 615*b*) of the transaction data reported by a particular agent during Transaction 2 can cause a determination (e.g., by boundary detection logic 232) that Transaction 2 falls within the transaction boundary causing at least a portion of Transaction 2 to involve an alternative version of a software component or a virtual service simulating the alternative version of the software component, among other examples.

Turning to FIG. 6B, additional examples of transaction data are illustrated, in this case for transactions "Transaction 4," "Transaction 5", and "Transaction 6". As noted above, transaction data can also be used to group transactions (and their transaction data) according to session, such as a session initiated or involving a particular user or client system. For instance, a transaction boundary can be defined that causes all transactions falling within a session of a particular user (e.g., a particular one of a team of developer-users) to be considered as falling within a transaction boundary to trigger the application of a particular development tool (e.g., a virtual service) in connection with various development activities related to the system. For instance, in the example of FIG. 6B, transaction data (e.g., 610*d*, 610*e*, 610*f*, 615*d*, 615*l*, 620*d*, 620*e*, 620*f*, 625*d*, 625*f*) is collected from instances of at least two different types of transactions. A characteristic 660*a*, 660*b* can be identified in transaction data 645, 650 of two different transactions, Transactions 4 and 5, that identifies that each transaction was included in particular user session (e.g., of the particular developer-user). Accordingly, Transactions 4 and 5 can be determined to fall within the corresponding transaction boundary to trigger the selective use of a modified version of a software component or a virtual service simulating the modified version of the software component.

Figure 7:
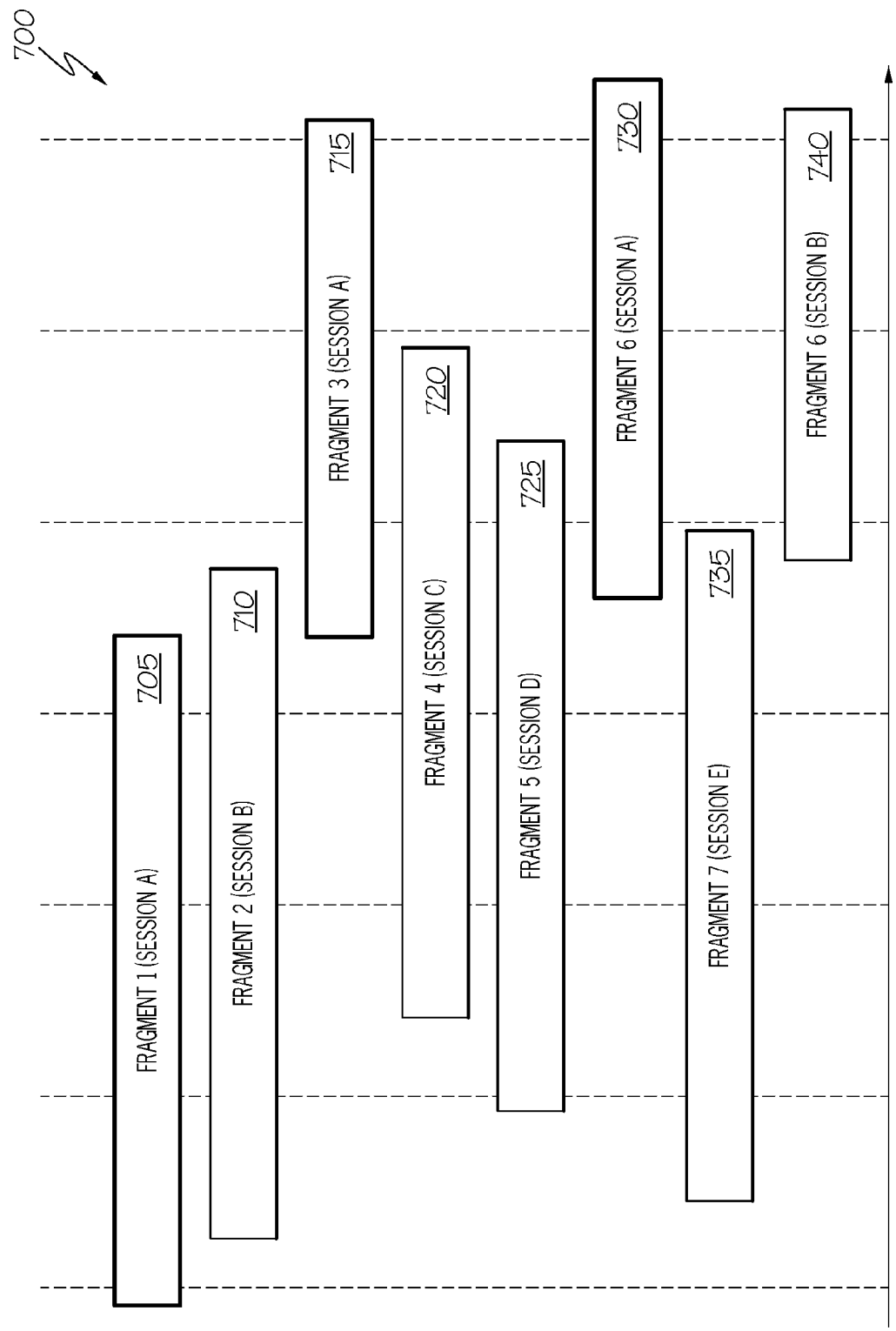
FIG. 7 is a simplified block diagram illustrating a collection of execution transactions running in connection with operation of an example software system.

Turning now to FIG. 7, a simplified diagram 700 is shown illustrating a collection of transaction fragments (e.g., 705, 710, 715, 720, 725, 730, 735, 740) involving request-response pairs between various software components during operation of a particular software system. At least some of the transaction fragments (e.g., 705, 710) occur (at least partially) concurrently and may involve the same software components. In this example, agents can monitor at least some of the transaction fragments (e.g., 705, 710, 715, 720, 725, 730, 735, 740) and generate corresponding transaction data describing characteristics and even content of the requests and response of the transaction fragments. Such transaction data can be used to determine relationships, or stitching, between the transaction fragments. For instance, transaction data can serve as the basis for determining that the transaction fragments are included within transactions within various user sessions involving the system. In this example, a transaction boundary can be defined such that the transaction fragments of transactions in a "Session A" are to cause the selective use of alternative versions of one or more software components within the transaction. For instance, a patched or otherwise modified copy of a software component can be employed in lieu of the native, standard, or default copy of the corresponding software component within transactions falling within the transaction boundary. Alternatively, a virtual service modeling the modified version of the software component can be invoked within the transactions within the session, among other examples.

Accordingly, a shared development platform can identify (from previously or contemporaneously generated transaction data) the sessions (and/or transactions) to which each transaction fragment (e.g., 705, 710, 715, 720, 725, 730, 735, 740) corresponds. In the specific example illustrated in FIG. 7, transaction fragments Fragment 1 (705), Fragment 3 (715), and Fragment 6 (720) can be determined to run within an instance of Session A and one or more downstream transaction fragments can be caused to involve a selectively deployed patched version of a particular component or a virtual service modeling an alternative version of the particular component, while other at least partially contemporaneous transactions (involving transaction fragments 710, 720, 725, 735, 740) do not, instead using standard or default versions of the particular component in the same or similar types of transactions and transaction fragments. As shown in FIG. 7, correlating transaction fragments (or even threads) to transactions and sessions can allow certain development tasks (such as selective deployment of a virtual service) to be applied in a targeted fashion to only some transactions.

Figure 8:
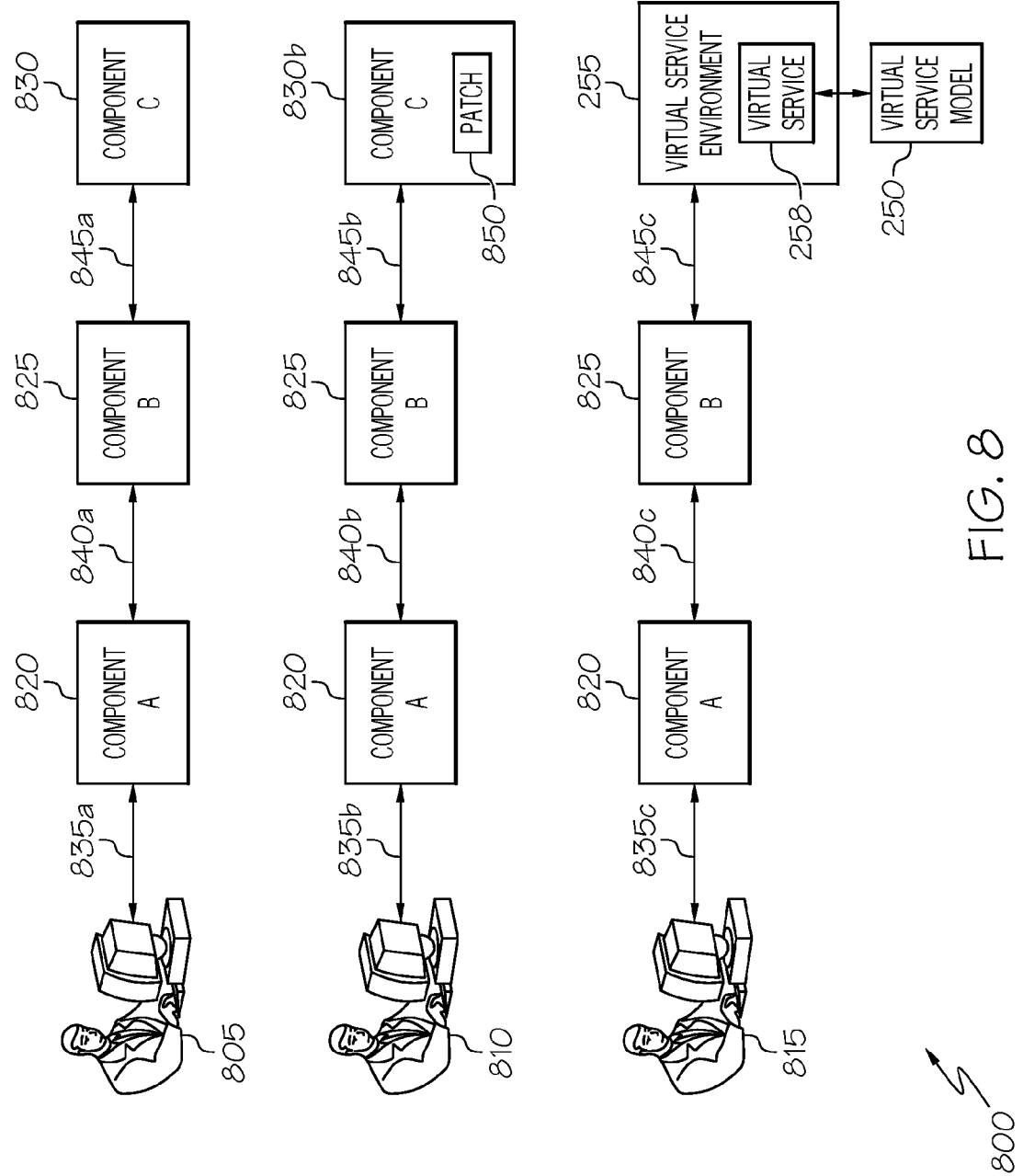
FIG. 8 is a simplified block diagram illustrating selective use of alternatives to a particular software component within some transactions of a software system.

Turning to FIG. 8, a simplified block diagram 800 is shown illustrating the selective utilization of an alternative to an existing software component by a development platform. In this example, multiple users (e.g., 805, 810, 815) may utilize a system that includes multiple different software components within a multi-tiered or other system architecture. For example, the users may construct tests or other simulations that involve running transactions within the system. Indeed, instances of the same type of transaction can be utilized by each of the users (e.g., 805, 810, 815).

In the particular example of FIG. 8, a particular one of several transaction types supported by a particular system may involve a request by a web browser (e.g., local to each of users 805, 810, 815) to a first software component, Component A 820, such as a front end web application interface. A first fragment (e.g., 835a-c) of the transaction may include the request from the web browser and the ultimate response from Component A 820. Downstream transaction fragments (e.g., 840a-c and 845a) can involve downstream requests and responses between Component A (820) and Component B (825) and Component B and Component C (830), respectively. During operation, the standard system (e.g., a production, test, or other pre-production version of the system) performs the particular transaction with transaction fragments 835a, 840a, 845a, utilizing Components A-C(820, 825, 830). However, in this example, transaction boundaries are defined to trigger the use of alternatives to Component C when certain conditions are identified.

In a first example, a transaction boundary is defined such that when a user session is identified involving a second user 810, use of a patched version of Component C is to be triggered by the development platform (e.g., using a patch manager) such that when an interaction with Component C is identified in a transaction falling within the transaction boundary, the request (e.g., of transaction fragment 845b) is made to a copy 830b of Component C having the patch 850 is made, rather than to the unpatched, standard version of Component C 830. Thus, the transaction (made of fragments 835b, 840b, 845b) can be used to test or observe how one or more components, or the system as a whole, operates when the patched version of Component C is utilized in instances of the particular transaction type. Indeed, the transaction involving the selectively employed patched version of Component C can take place at substantially the same time as (or at least partially contemporaneously with) other transactions of the same type that utilize the standard version of Component C (e.g., a transaction not involving user 810 and including transaction fragments 835a, 840a, 845a).

Selectively and conditionally using an alternate version of a particular software component (e.g., 830) can allow various different functionality to be conditionally introduced into a system under development. In one example, a library of different patches or patched versions of a particular component can be maintained, with each patch being associated with a condition corresponding to a given transaction boundary, to allow the patched versions to be intermittently and temporarily utilized within the system in connection with various development activities involving the system. For instance, a different patched version of Component C can be provided and utilized when another different transaction boundary is identified as applying to a transaction (e.g., from characteristics captured from monitoring of an upstream fragment of the transaction).

In some implementations, in lieu of or in addition to conditionally using modified versions or copies of a particular software component (e.g., Component C (830)), a virtualized instance of the particular software component, or virtual service, can be invoked and utilized instead of the particular software component in a particular transaction based on identifying that the particular transaction falls within a corresponding transaction boundary. In some cases, the virtual service can simulate the standard operation (e.g., response behavior) of the particular software component. Such standard operation can be modeled from a corresponding service model generated from monitoring and capturing live transactions involving the particular software components. In some instances, this "standard" behavior of the particular software component defined in the service model (e.g., 250) can be edited or supplemented (e.g., with additional service model entries) such that virtual services (e.g., 258) generated from the edited service model simulate behavior of a modified version of the particular software component, such that the simulated behavior deviates in some manner intentionally from the behavior observed during recording of the actual particular software component's standard behavior.

In the example of FIG. 8, a second transaction boundary can be defined that is triggered when a user session of user 815 is detected from transaction data captured from monitoring of the system (e.g., by agents deployed within the system). Further, transactions and their component transaction fragments within the designated user session can be defined to utilize a virtual service 258 simulating Component C (830). Indeed, a user session involving user 815 can be identified, for instance, from transaction data collected in monitoring of transaction fragment 835c (e.g., based on identification of a User ID, cookie, session ID, or other data in a request sent by the browser and intercepted by the agent). Further monitoring of the system can identify that transaction fragments 840c and 845c are part of the same transaction as transaction fragment 835c, based on identifying correlations between characteristics of the transaction fragments and stitching together the transaction fragments (e.g., utilizing a transaction path engine 230). Additionally, the transaction boundary defined for the detected user session can define that transaction fragments of transactions within the boundary that ordinarily involve or call upon Component C are to cause the invocation and use of a virtual service (e.g., based on a specified (e.g., specially modified) service model) in lieu of Component C itself. For instance, virtual service 258 can be instantiated within a virtual service environment 255 (e.g., implemented using a virtual machine) and a shared development platform can identify that the conditional use of the virtual service 258 has been triggered (by a transaction within a corresponding transaction boundary). In some cases, instantiation of the virtual service 258 can be in response to detecting that a particular transaction falls within a corresponding transaction boundary. Further, instantiation of the virtual service 258 can include the identification of a particular service model 250 corresponding to the transaction boundary (e.g., a particular service model modeling either the standard or a modified version of the software component (e.g., Component C) to be replaced). The development platform can intercept requests intended for Component C (e.g., using an agent on Component B or between Components B and C) and redirect the requests to the virtual service environment 255 and virtual service 258. The virtual service 258 can generate a synthesized, or simulated, response of Component C based on the automatically selected service model 250 corresponding to the detected transaction boundary and return the simulated response to Component B 825 to complete the transaction fragment 258. Other contemporaneous transactions falling outside this transaction boundary (e.g., transaction involving other development users) can be allowed to continue to interact, instead, with the real, standard version of Component C 830. In some cases, the simulated response can deviate in meaningful (and intentional) ways from a response generated by the modeled component (e.g., Component C). Other transactions falling within the user session-based transaction boundary of this example can likewise trigger the use of virtual service 258 to stand-in for the modeled component (e.g., Component C).

While the examples of FIG. 8 contemplate transaction boundaries based on user sessions, other or additional transaction boundary conditions can be defined to conditionally trigger the use of a selectively employed patched software component or virtual service. For instance, the time or date a transaction was invoked, the size or content of a request within one of the transaction fragments (e.g., 835b,c, 840b,c, 845b,c), the type of web browser used to launch the transaction (e.g., a specialized browser or a browser using a specialized development related plugin, etc.) can also trigger the conditional use of a patched software component 830b or virtual service 258, among other example conditions. Indeed, a combination of conditions can be defined for a transaction boundary, in some instance, including user session-based conditions and non-session-based condition, such that satisfaction of any one, or alternatively, selection of all of multiple different conditions defined for the transaction boundary trigger the use of a corresponding patched software component or virtual service associated with the transaction boundary, among other examples.

Transaction boundaries can further be defined that utilize a patched software component or virtual service for only particular types of transactions or particular transaction fragments within a particular transaction type. In other words, in some implementations, a transaction boundary can be defined that triggers the use of a patched software component or virtual service to stand-in for a standard version of a particular software component for some transaction fragments (e.g., requests-responses), but not others, even within the same transaction or session. In other cases, a transaction boundary may dictate that a particular patched software component or virtual service replaces a corresponding software component within every transaction fragment falling within the transaction boundary, among other examples.

In some cases, a virtual service developed from a service model to model a modified version of a particular software component can be used instead of a patched version of the particular software component. For instance, rather than developing a second modified copy of the particular software component itself, a service model can be defined from which a virtual service simulates functionality (e.g., responses) of such a patched software component. In other cases, a patched version of the particular software component can be used in some cases and a virtual service virtualizing the particular software component can be used in others. In still other examples, virtual instances of a particular software component can also simulate requests that might be made by a modified version of the particular software component within a transaction falling within a particular transaction boundary. Simulated requests of a virtual instance of the particular software component may also be based on a model generated, at least in part, from observed requests made by the particular software component during previous monitoring of the actual request behavior of the particular software component, among other examples and features.

Figure 9A:
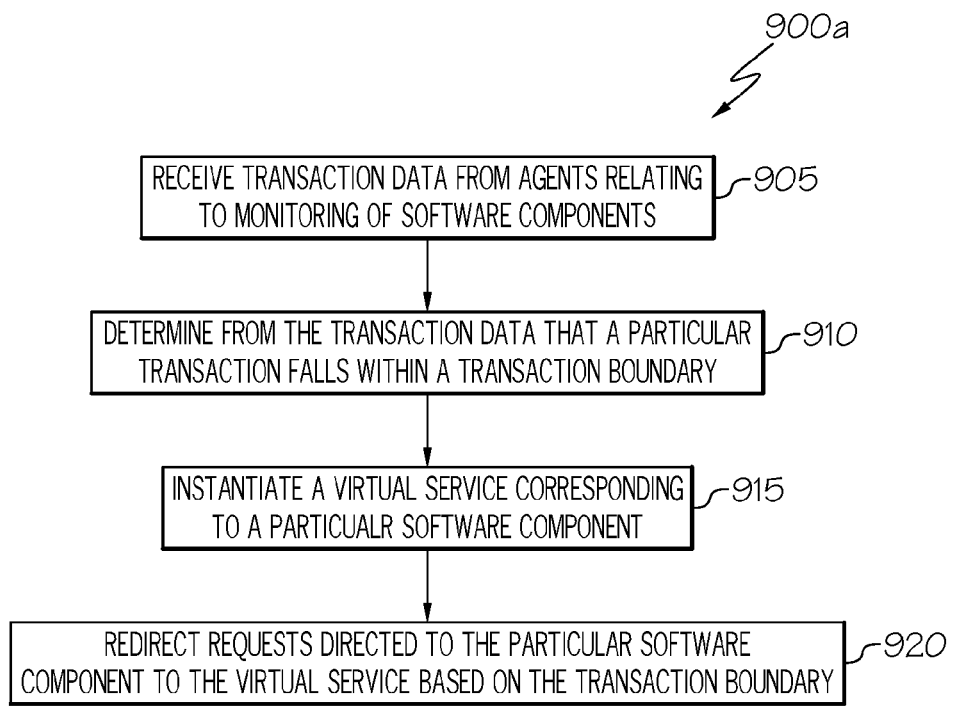
FIGS. 9A-9B are simplified flowcharts illustrating example techniques in connection with transaction boundaries defined for a software system in accordance with at least one embodiment.

FIG. 9A is a flowchart 900a of an example technique for performing targeted virtualization within a software system. For instance, transaction data can be received 905 from a variety of agents monitoring a plurality of software components in the system. The transaction data can identify characteristics of various fragments of a plurality of transactions observed by the agents. At least a particular one of the transactions can be determined 910 to fall within a defined transaction boundary. In some cases, the particular transaction can be one of several transactions (e.g., in one or more sessions) determined (from the transaction data) to fall within the transaction boundary. The transaction boundary definition can specify that, when a transaction is detected (e.g., 910) to fall within the transaction boundary, a particular software component involved within the transaction is to be replaced by a specific virtual service modeling a version of the particular software component (e.g., based on a corresponding service model) in one or more transaction fragments of the transaction. Accordingly, the virtual service can be instantiated 915 (e.g., ahead of time, or in response to determining 910 that a transaction falls within the transaction boundary), allowing requests of another software component within the system to send requests to the virtual service instead of the actual software component modeled by the virtual service. For instance, requests of the other software component can be redirected 920 to the virtual service. The virtual service can, in turn, generate simulated responses of the particular software component and return these responses to the other software component to facilitate the ultimate completion of the corresponding transaction. Additional activities can be completed in connection with such a transaction (involving the conditionally invoked virtual service). For instance, a testing system can monitor performance of one or more components of the system and provide measures of the performance (e.g., to indicate integration or relative performance of a modified version of the software component or the system as a whole), among other examples.

Figure 9B:
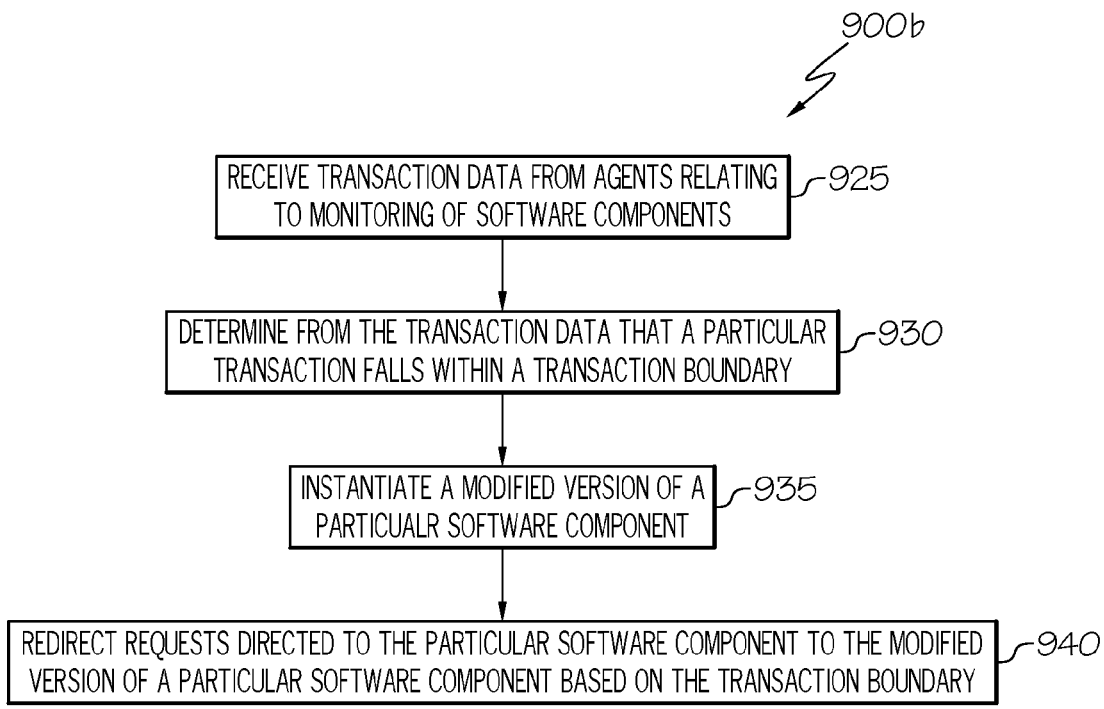

FIG. 9B is a flowchart 900b of an example technique for performing targeted virtualization within a software system. For instance, transaction data can be received 925 from a variety of agents monitoring a plurality of software components in the system. The transaction data can identify characteristics of various fragments of a plurality of transactions observed by the agents. At least a particular one of the transactions can be determined 930 to fall within a defined transaction boundary. In some cases, the particular transaction can be one of several transactions (e.g., in one or more sessions) determined (from the transaction data) to fall within the transaction boundary. The transaction boundary definition can specify that, when a transaction is detected (e.g., 930) to fall within the transaction boundary, a particular software component involved within the transaction is to be replaced by a modified version of the particular software component in a least some fragments of the transaction. The modified version can be a patched version of the particular software component, modified by a patch that changes at least some of the functionality of the particular software component. Accordingly, the modified version of the particular software component can be instantiated 935 within at least some transaction fragments that would ordinarily use the standard version of the particular software components. In some fragments, requests of another software component within the system can be redirected 940 to the modified version of the particular software component (instead of being directed to the standard version of the particular software component). The modified version of the particular software component can generate responses to the received requests. In some instances, responses generated by the modified version of the particular software component will differ from responses generated by the standard version of the particular software component. In some fragments, the modified version of the particular software component can generate requests that are sent to other software components in the transaction (in lieu of these requests being sent by the standard version of the software component). These requests can be dependent on responses received by the modified version of the particular software component within the transaction. Requests generated by the modified version of the particular software component may also differ from requests generated by the standard version of the particular software component, in some cases.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving transaction data from a software-based agent instrumented on a first software component in a system comprising a plurality of software components, wherein the transaction data identifies characteristics of a particular transaction involving the first software component and a second software component in the plurality of software components as observed by the agent during operation of the system, and the particular transaction is contemporaneous with another transaction involving software components in the system;
using a data processing apparatus to determine, from the transaction data, that the particular transaction falls within a defined transaction boundary for the system, wherein transactions meeting a set of conditions fall within the transaction boundary, and the other transaction falls outside the transaction boundary; and
instantiating a virtual service for use in the particular transaction, wherein the virtual service simulates responses of a particular one of the plurality of software components, another one of the plurality of software components is to interact with the virtual service in the particular transaction based on the particular transaction falling within the transaction boundary;
redirecting a first request, sent from the other software component to the particular software component in the particular transaction, to the virtual service; and
allowing a second request, sent from the other software component to the particular software component in the other transaction, to proceed to the particular software component based on the other transaction falling outside the transaction boundary, wherein the other transaction is contemporaneous with the particular transaction.

2. The method of claim 1, wherein the other software component comprises the first software component and the particular software component comprises the second software component.

3. The method of claim 1, wherein the characteristics comprise an indication of a session involving a particular user and the transaction boundary defines transactions within sessions involving the particular user.

4. The method of claim 3, wherein transaction boundary defines transactions within sessions of any one of a particular group of users comprising the particular user.

5. The method of claim 3, wherein the first software component receives a session identifier corresponding to the particular user and the second software component does not receive the session identifier.

6. The method of claim 3, wherein the particular transaction comprises a plurality of transaction fragments, the transaction data comprises first transaction data describing a first one of the plurality of transaction fragments, and the method further comprises:
receiving second transaction data from another agent, wherein the second transaction data identifies characteristics of a second one of the plurality of transaction fragments;

determining, from the characteristics of the second transaction fragment, that the first and second transaction fragments are fragments of the particular transaction; and determining that the second transaction fragment is in the session.

7. The method of claim 6, wherein the second transaction fragment involves the second software component and a third one of the plurality of software components.

8. The method of claim 7, wherein the particular software component comprises the third software component.

9. The method of claim 3, wherein the particular user is one of a plurality of users accessing the system.

10. The method of claim 1, wherein the characteristics comprise a particular value being included in an original request of the transaction.

11. The method of claim 1, wherein the characteristics comprise the transaction being invoked by a particular background process.

12. The method of claim 1, wherein the characteristics comprise size of a particular request in the transaction being in excess of a threshold.

13. The method of claim 1, wherein the particular transaction and the other transaction are transactions of a particular type.

14. The method of claim 13, wherein the other software component is to send a request to the particular software component in transactions of the particular type.

15. The method of claim 14, wherein the other software component sends the request to the virtual service in the particular transaction and the virtual service generates a simulated response of the other software component in the particular transaction responsive to the request.

16. The method of claim 15, wherein the virtual service is instantiated from a virtual service model, the virtual service model is based at least in part on automated monitoring of operation of the particular software component, the virtual service model further models a modification to the particular software component, and the simulated response is different from a real response of the particular software component to the request.

17. The method of claim 1, wherein instantiating the virtual service comprises:
identifying a virtual service model corresponding to the particular software components, wherein the virtual service model models responses of the particular software component to requests of the particular software component;
launching the virtual service in a virtual service environment comprising a virtual machine, wherein a request by the other software component to the particular software component in the particular transaction is to be redirected to the virtual service, and the virtual service accesses the virtual service model to generate a simulated response to the request and sends the simulated response to the other software component.

18. A non-transitory computer program product comprising a computer readable storage medium comprising computer readable program code embodied therewith, the computer readable program code comprising:
computer readable program code configured to receive transaction data from a software-based agent instrumented on a first software component in a system comprising a plurality of software components, wherein the transaction data identifies characteristics of a particular transaction involving the first software component and a second software component in the plurality of software components as observed by the agent during operation of the system, and the particular transaction is contemporaneous with another transaction involving software components in the system;
computer readable program code configured to determine, from the transaction data, that the particular transaction falls within a defined transaction boundary for the system and that the other transaction falls outside the transaction boundary, wherein transactions meeting a particular set of conditions fall within the transaction boundary; and
computer readable program code configured to instantiate a virtual service for use in the particular transaction based on the particular transaction falling within the transaction boundary, wherein the virtual service simulates responses of a particular one of the plurality of software components, another one of the plurality of software components is to send a request to the virtual service in the particular transaction based on the particular transaction falling within the transaction boundary, and the other software component is to send a request to the particular software component in the other transaction
computer readable program code configured to redirect a first request, sent from the first software component to the particular software component in the particular transaction, to the virtual service; and
computer readable program code configured to allow a second request, sent from the first software component to the particular software component in the other transaction, to proceed to the particular software component based on the other transaction falling outside the transaction boundary.

19. A system comprising:
a data processor;
a memory;
a virtualization system to host a virtual service, operable to simulate responses of a particular one of a plurality of software components in a system based on a virtual service model corresponding to the particular software component; and
an agent manager to:
receive transaction data from a software-based agent instrumented on a first software component in the system, wherein the transaction data identifies characteristics of a particular transaction involving at least a portion of the plurality of software components as observed by the agent during operation of the system, and the particular transaction is contemporaneous with another transaction involving the portion of the plurality of software components;
determine, from the transaction data, that the particular transaction falls within a defined transaction boundary for the system, wherein transactions meeting a set of conditions fall within the transaction boundary, and the other transaction falls outside the transaction boundary;
cause another one of the plurality of software components to interact with the virtual service in the particular transaction based on the particular transaction falling within the transaction boundary; and
cause the other software component to interact with the particular software component in the other transaction based on the other transaction falling outside the transaction boundary, wherein the particular transaction is contemporaneous with the other transaction.

20. The system of claim 19, further comprising a plurality of agents instrumented on the plurality of software components, wherein the plurality of agents comprises the agent.

* * * * *